(12) United States Patent  
Soya et al.

(10) Patent No.: US 10,564,763 B2  
(45) Date of Patent: Feb. 18, 2020

(54) TOUCH DETECTING APPARATUS, DISPLAY APPARATUS WITH TOUCH DETECTION FUNCTION, AND TOUCH DETECTION METHOD

(71) Applicant: Japan Display Inc., Tokyo (JP)

(72) Inventors: Toshio Soya, Tokyo (JP); Toshinori Uehara, Tokyo (JP); Hiroshi Mizuhashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 227 days.

(21) Appl. No.: 15/437,686

(22) Filed: Feb. 21, 2017

(65) Prior Publication Data

US 2017/0242531 A1 Aug. 24, 2017

(30) Foreign Application Priority Data

Feb. 22, 2016 (JP) .................. 2016-031119

(51) Int. Cl.
    *G06F 3/041* (2006.01)
    *G06F 3/044* (2006.01)
    *G02F 1/1333* (2006.01)

(52) U.S. Cl.
    CPC ........ *G06F 3/0416* (2013.01); *G02F 1/13338* (2013.01); *G06F 3/044* (2013.01);
    (Continued)

(58) Field of Classification Search
    CPC ...... G06F 3/0416; G06F 3/044; G06F 3/0412; G06F 2203/04108; G06F 2203/04107; G06F 2203/04101; G02F 1/13338
    See application file for complete search history.

(56) References Cited

U.S. PATENT DOCUMENTS

2009/0309851 A1* 12/2009 Bernstein .............. G06F 3/0416  
345/174  
2014/0362042 A1* 12/2014 Noguchi ............... G06F 3/0412  
345/174

(Continued)

FOREIGN PATENT DOCUMENTS

JP  2010-019785 A  1/2010  
JP  2011-134000     7/2011

(Continued)

OTHER PUBLICATIONS

Japanese Office Action dated Apr. 11, 2019 in corresponding Japanese Application No. 2016-031119.

*Primary Examiner* — Patrick N Edouard  
*Assistant Examiner* — Joseph P Fox  
(74) *Attorney, Agent, or Firm* — K&L Gates LLP

(57) ABSTRACT

According to an aspect, a touch detecting apparatus includes: three or more detectors; three or more detection signal lines; an integration line; three or more switches; and a control circuit. The control circuit controls the number of times an output integration is performed. During the output integration, the control circuit switches a first type switch to a decoupling mode, and switches second type switches to a coupling mode. The first type switch is one switch coupled to a first type detector, and each second type switch is coupled to one or more of second type detectors with which the second type switch corresponds. During the output integration, the integration line outputs an integrated output of outputs from the second type detectors. The output integration is performed a plurality of times corresponding to at least the number of the detectors while a combination of the second type detectors is changed.

8 Claims, 21 Drawing Sheets

(52) U.S. Cl.
CPC .. *G06F 3/0412* (2013.01); *G06F 2203/04101* (2013.01); *G06F 2203/04107* (2013.01)

(56) References Cited

U.S. PATENT DOCUMENTS

| | | | | |
|---|---|---|---|---|
| 2015/0338952 | A1* | 11/2015 | Shahparnia | G06F 3/044 345/174 |
| 2016/0062501 | A1* | 3/2016 | Hsu | G06F 3/044 345/174 |
| 2017/0090669 | A1* | 3/2017 | Paladugu | G06F 3/0418 |

FOREIGN PATENT DOCUMENTS

| | | |
|---|---|---|
| JP | 2014-052997 | 3/2014 |
| JP | 2014-241049 | 12/2014 |
| JP | 2015-032234 | 2/2015 |

\* cited by examiner

| | COMPARATIVE EXAMPLE | FIRST EMBODIMENT |
|---|---|---|
| Signal | 775 | 799 |
| Noise ($\sigma$) | 80 | 69 |
| S/N (Signal/$3\sigma$) | 3.2 | 3.9 |
| S/N INCREASE RATE (MEASURED VALUE) | 100% | 119% |
| S/N INCREASE RATE (CALCULATED VALUE) | 100% | 113% |

TOUCH DETECTING APPARATUS, DISPLAY APPARATUS WITH TOUCH DETECTION FUNCTION, AND TOUCH DETECTION METHOD

CROSS-REFERENCE TO RELATED APPLICATIONS

This application claims priority from Japanese Application No. 2016-031119, filed on Feb. 22, 2016, the contents of which are incorporated by reference herein in its entirety.

BACKGROUND

1. Technical Field

The present invention relates to a touch detecting apparatus, a display apparatus with a touch detection function, and a touch detection method.

2. Description of the Related Art

Widely known are touch detecting apparatuses that detect contact of an object and can output data indicating the shape of unevenness or the like of the object at the contact portion (Japanese Patent Application Laid-open Publication No. 2010-019785, for example).

In touch detecting apparatuses, detection accuracy may possibly be reduced by noise generated in touch detection performed by sensors and in transmission of signals indicating touch detection results. To address this, there has been developed a method of combining signals from a plurality of sensors that detect contact of an object and increasing the signal intensity, thereby readily distinguishing signals from noise. Combining the output signals, however, prevents the detection results of the individual sensors from being individually handled, thereby generating blur in data indicating the shape of the object. As a result, the measure against noise described above reduces the accuracy in detecting the shape of the object.

There have also been developed some measures against noise to make such a blur less likely to occur, including a method of repeating touch detection a plurality of times. Specifically, this is a method of causing individual sensors to output a signal a plurality of times and superimposing the signals, thereby increasing the signal intensity. The method, however, increases the time for touch detection because of the repetition of touch detection a plurality of times.

For the foregoing reasons, there is a need for a touch detecting apparatus, a display apparatus with a touch detection function, and a touch detection method that can increase the accuracy in detecting the shape of an object in a shorter time.

SUMMARY

According to an aspect, a touch detecting apparatus includes: three or more detectors; three or more detection signal lines, wherein each of the detection signal lines are coupled to one or more of the detectors with which the detection signal line corresponds, and each of the detectors is only coupled to one of the detection signal lines with which the detector corresponds; an integration line; three or more switches, wherein the switches are coupled, on a one-to-one basis, to the detection signal lines; and a control circuit, wherein the control circuit is configured to switch each of the switches between a coupling mode and a decoupling mode, the coupling mode is a mode in which the detection signal line is coupled to the integration line, and the decoupling mode is a mode in which the detection signal line is decoupled from the integration line. The control circuit controls the number of times an output integration is performed. During the output integration, the control circuit switches a first type switch to the decoupling mode, and switches a plurality of second type switches to the coupling mode. The first type switch is one switch coupled to a first type detector, the second type switches are switches other than the one switch, each of the second type switches is coupled to one or more of a plurality of second type detectors with which the second type switch corresponds, and each of the second type detectors is only coupled to one of the second type switches with which the second type detector corresponds. During the output integration, the integration line outputs an integrated output of outputs from the plurality of second type detectors. The output integration is performed a plurality of times corresponding to at least the number of the detectors while a combination of the second type detectors is changed.

According to another aspect, a display apparatus with a touch detection function includes: a display device including a plurality of pixels; three or more detectors; three or more detection signal lines, wherein each of the detection signal lines is coupled to one or more of the detectors with which the detection signal line corresponds, and each of the detectors is only coupled to one of the detection signal lines with which the detector corresponds; an integration line; three or more switches, wherein the switches are coupled, on a one-to-one basis, to the detection signal lines; and a control circuit, wherein the control circuit is configured to switch each of the switches between a coupling mode and a decoupling mode, the coupling mode is a mode in which the detection signal line is coupled to the integration line, and the decoupling mode is a mode in which the detection signal line is decoupled from the integration line. The control circuit controls the number of times an output integration is performed. During the output integration, the control circuit switches a first type switch to the decoupling mode, and switches a plurality of second type switches to the coupling mode. The first type switch is one switch coupled to a first type detector, the second type switches are switches other than the one switch, each of the second type switches is coupled to one or more of a plurality of second type detectors with which the second type switch corresponds, and each of the second type detectors is only coupled to one of the second type switches with which the second type detector corresponds. During the output integration, the integration line outputs an integrated output of outputs from the second type detectors. The output integration is performed a plurality of times corresponding to at least the number of the detectors while a combination of the second type detectors is changed.

According to another aspect, a touch detection method includes: integrating outputs from a plurality of second type detectors other than a first type detector included in a group of three or more detectors a plurality of times corresponding to at least the number of the three or more detectors included in the group of the detectors while changing the first type detector; and performing complementary processing based on an integrated output of the second type detectors to calculate a detection result of the first type detector.

DETAILED DESCRIPTION

Figure 1:
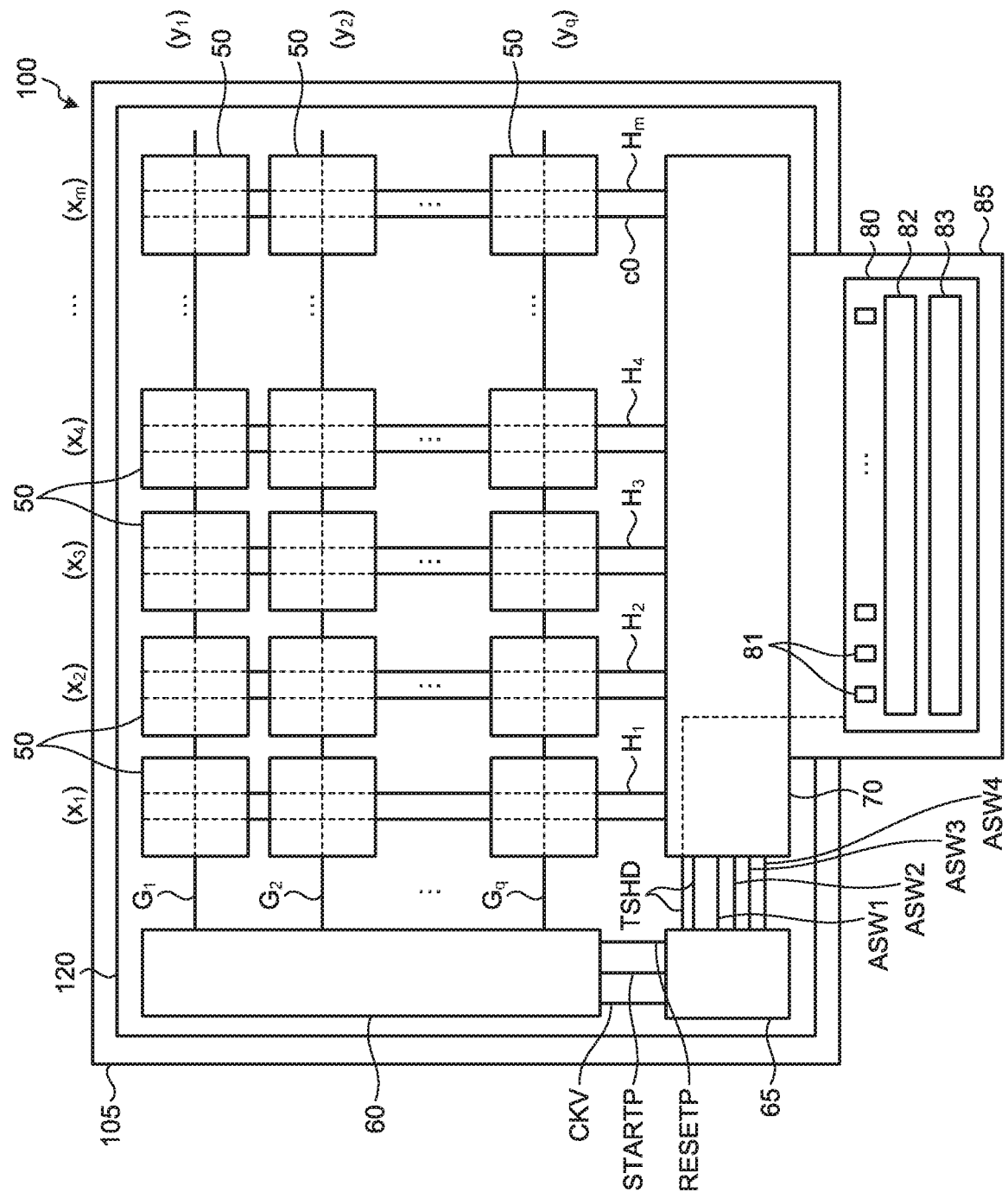
FIG. 1 is a schematic diagram illustrating an example of a main configuration of a touch detecting apparatus according to a first embodiment.

Exemplary embodiments according to the present invention are described below with reference to the accompanying drawings. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the figures, components similar to those previously described with reference to preceding figures are denoted by the same reference numerals, and detailed explanation thereof may be appropriately omitted.

In this disclosure, when an element is described as being "on" another element, the element can be directly on the other element, or there can be one or more elements between the element and the other element.

First Embodiment

FIG. 1 is a schematic diagram illustrating an example of a main configuration of a touch detecting apparatus 100 according to a first embodiment. The touch detecting apparatus 100 includes electrodes 50 serving as detectors, a drive driver 60, a selector 70, a touch detection circuit 80, and the like. The touch detection circuit 80, for example, is mounted on a printed circuit board 85, such as a flexible printed circuit board, coupled to the selector 70. The touch detection circuit 80 includes circuits 81, an analog/digital (A/D) converter 82, and an arithmetic circuit 83, for example. The touch detection circuit 80 according to the present embodiment is mounted by what is called the chip on film (COF) technology. This is given as an example of a mounting technology for the touch detection circuit 80, and the present invention is not limited thereto. The touch detection circuit 80 may be mounted by what is called the chip on glass (COG) technology of mounting it on a glass substrate, for example.

The electrodes 50 are provided in a detection area to detect proximity or contact of an object. Specifically, the electrodes 50 are arranged in a two-dimensional (e.g., planar) detection area to detect proximity or contact of an object (e.g., a finger of a person). The electrodes 50 are coupled to the circuits 81 (refer to FIGS. 2 and 3) and output signals indicating proximity or contact of the object to the circuits 81. In the following description, an operation relating to "proximity or contact of an object to or with the detection area" may be referred to as a "touch operation". In addition, "detection of proximity or contact of an object" may be referred to as "touch detection".

Figure 2:
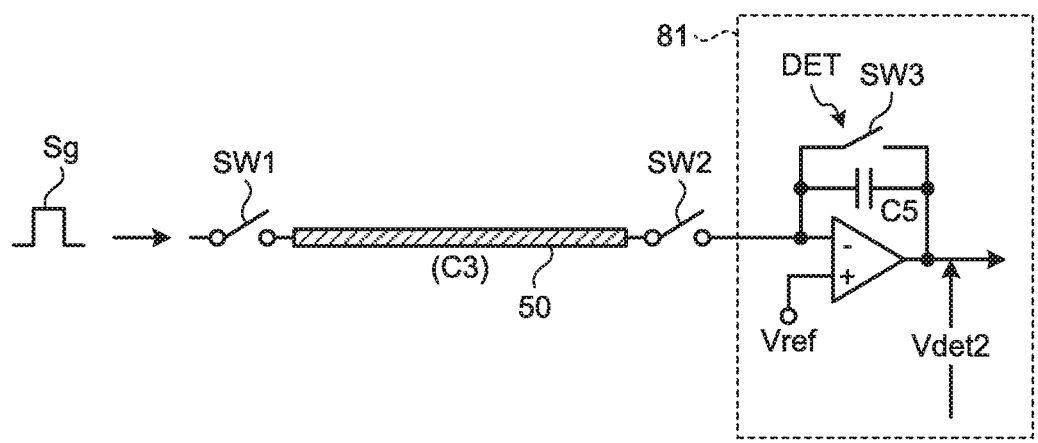
FIG. 2 is a diagram for explaining a basic principle of self-capacitive touch detection and illustrates a state where a finger is neither in contact with nor in proximity to a touch detection electrode.
Figure 3:
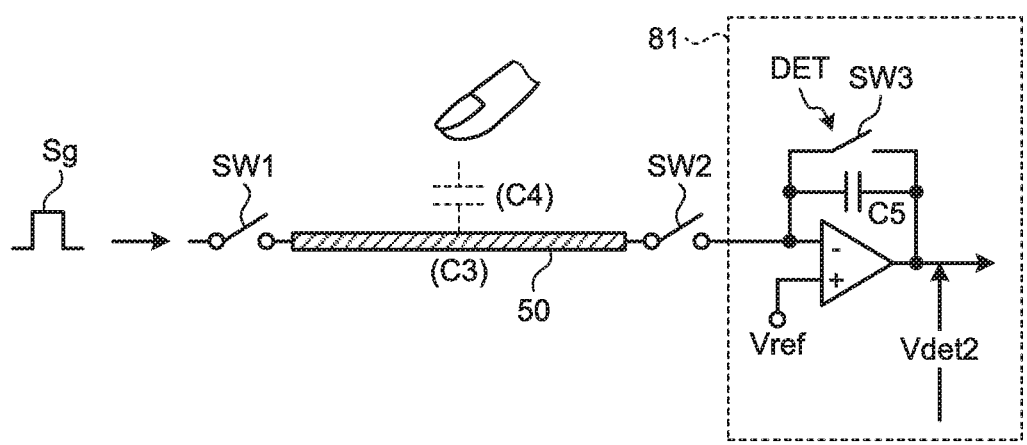
FIG. 3 is a diagram for explaining the basic principle of self-capacitive touch detection and illustrates a state where a finger is in contact with or in proximity to the touch detection electrode.
Figure 4:
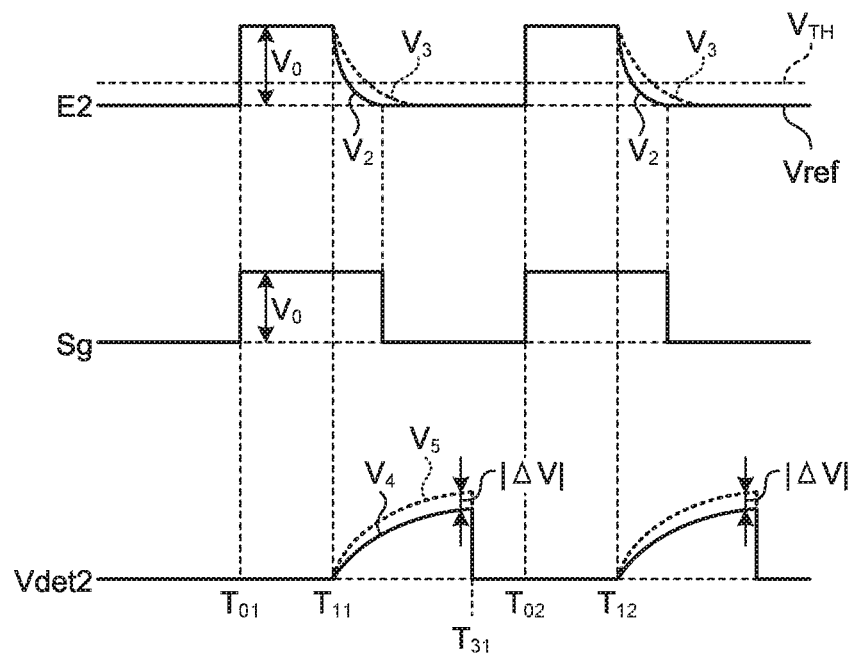
FIG. 4 is a diagram of an example of waveforms of a drive signal and a touch detection signal.

The following describes a basic principle of self-capacitive touch detection employed in the first embodiment with reference to FIGS. 2 to 4. FIG. 2 is a diagram for explaining the basic principle of self-capacitive touch detection and illustrates a state where a finger is neither in contact with nor in proximity to a touch detection electrode. FIG. 3 is a diagram for explaining the basic principle of self-capacitive touch detection and illustrates a state where a finger is in contact with or in proximity to the touch detection electrode. FIG. 4 is a diagram of an example of waveforms of a drive signal and a touch detection signal.

As illustrated in FIG. 2, in a state where a finger is neither in contact with nor in proximity to the electrode, an alternating-current (AC) rectangular wave Sg having a predetermined frequency (e.g., approximately several kilohertz to several hundred kilohertz) is applied to the electrode 50. The electrode 50 has capacitance C3, and an electric current depending on the capacitance C3 flows. A voltage detector DET converts change in the electric current depending on the AC rectangular wave Sg into change in voltage (waveform $V_4$ indicated by the solid line (refer to FIG. 4)).

As illustrated in FIG. 3, in a state where a finger is in contact with or in proximity to the electrode, capacitance C4 between the finger and the touch detection is added to the capacitance C3 of the electrode 50. When the AC rectangular wave Sg is applied to the electrode 50, an electric current depending on the capacitance C3 and C4 flows. As illustrated in FIG. 4, the voltage detector DET converts change in the electric current depending on the AC rectangular wave Sg into change in voltage (waveform $V_5$ indicated by the dotted line). By integrating the voltage values of the waveforms $V_4$ and $V_5$ and comparing these values, it is determined whether a finger is in contact with or in proximity to the electrode 50. Alternatively, it may be determined whether a finger is in contact with or in proximity to the electrode 50 by calculating respective periods until a waveform $V_2$ and a waveform $V_3$ illustrated in FIG. 4 decrease to a predetermined reference voltage and comparing the periods, for example.

Specifically, as illustrated in FIGS. 2 and 3, the electrode 50 can be cut off by a switch SW1 and a switch SW2. In FIG. 4, the voltage level of the AC rectangular wave Sg is raised by an amount corresponding to voltage $V_0$ at time $T_{01}$. At this time, the switch SW1 is turned on, and the switch SW2 is turned off. As a result, the voltage in the electrode 50 is also raised by $V_0$. When the switch SW1 is turned off, the electrode 50 turns to an electrically floating state, and the voltage in the electrode 50 is maintained at $V_0$ due to the capacitance C3 (refer to FIG. 2) of the touch detection electrode (electrode 50) or due to capacitance (C3+C4, refer to FIG. 3) obtained by adding the capacitance C4 generated by contact or proximity of a finger or the like to the capacitance C3 of the touch detection electrode (electrode 50). Subsequently, a switch SW3 is turned on before time $T_{11}$ and is turned off after a predetermined time has elapsed, thereby resetting the voltage detector DET. With this reset operation, the output voltage is made substantially equal to reference voltage Vref.

Subsequently, when the switch SW2 is turned on at time $T_{11}$, the voltage at an inversion input terminal of the voltage detector DET increases to the voltage $V_0$ equal to that of the electrode 50. Subsequently, the voltage at the inversion input terminal of the voltage detector DET decreases to the reference voltage Vref based on a time constant of the capacitance C3 (or C3+C4) of the electrode 50 and capacitance C5 in the voltage detector DET. At this time, the electric charges accumulated in the capacitance C3 (or C3+C4) of the electrode 50 move to the capacitance C5 in the voltage detector DET, whereby an output (Vdet2) from the voltage detector DET increases. When a finger or the like is not in proximity to the electrode 50, the output (Vdet2) from the voltage detector DET is represented by the waveform $V_4$ indicated by the solid line, and Vdet2=C3·$V_0$/C5 is satisfied. When capacitance generated by an effect of a finger or the like is added, the output is represented by the waveform $V_5$ indicated by the dotted line, and Vdet2=(C3+C4)·$V_0$/C5 is satisfied. Subsequently, at time $T_{31}$ after the electric charges in the capacitance C3 (or C3+C4) of the electrode 50 sufficiently move to the capacitance C5, the switch SW2 is turned off, and the switch SW1 and the switch SW3 are turned on. As a result, the electric potential of the electrode 50 decreases to a low level equal to that of the AC rectangular wave Sg, and the voltage detector DET is reset. The timing to turn on the switch SW1 may be any timing after the turning off of the switch SW2 and before time $T_{02}$. The timing to reset the voltage detector DET may be any timing after the turning off of the switch SW2 and before time $T_{12}$. The operation described above is repeatedly performed at a predetermined frequency (e.g., a frequency of the order of several kilohertz to several hundred kilohertz). It can be determined whether an external proximate object is present (whether a touch operation is performed) based on an absolute value |ΔV| of the difference between the waveform $V_4$ and the waveform $V_5$. As illustrated in FIG. 4, when a finger or the like is not in proximity to the electrode, the electric potential of the electrode 50 is represented by the waveform $V_2$. By contrast, when the capacitance C4 generated by an effect of a finger or the like is added, the electric potential is represented by the waveform $V_3$. By measuring a time period until the waveforms $V_2$ and $V_3$ to decrease to predetermined voltage $V_{TH}$, it can be determined whether an external proximate object is present (whether a touch operation is performed).

Figure 5:
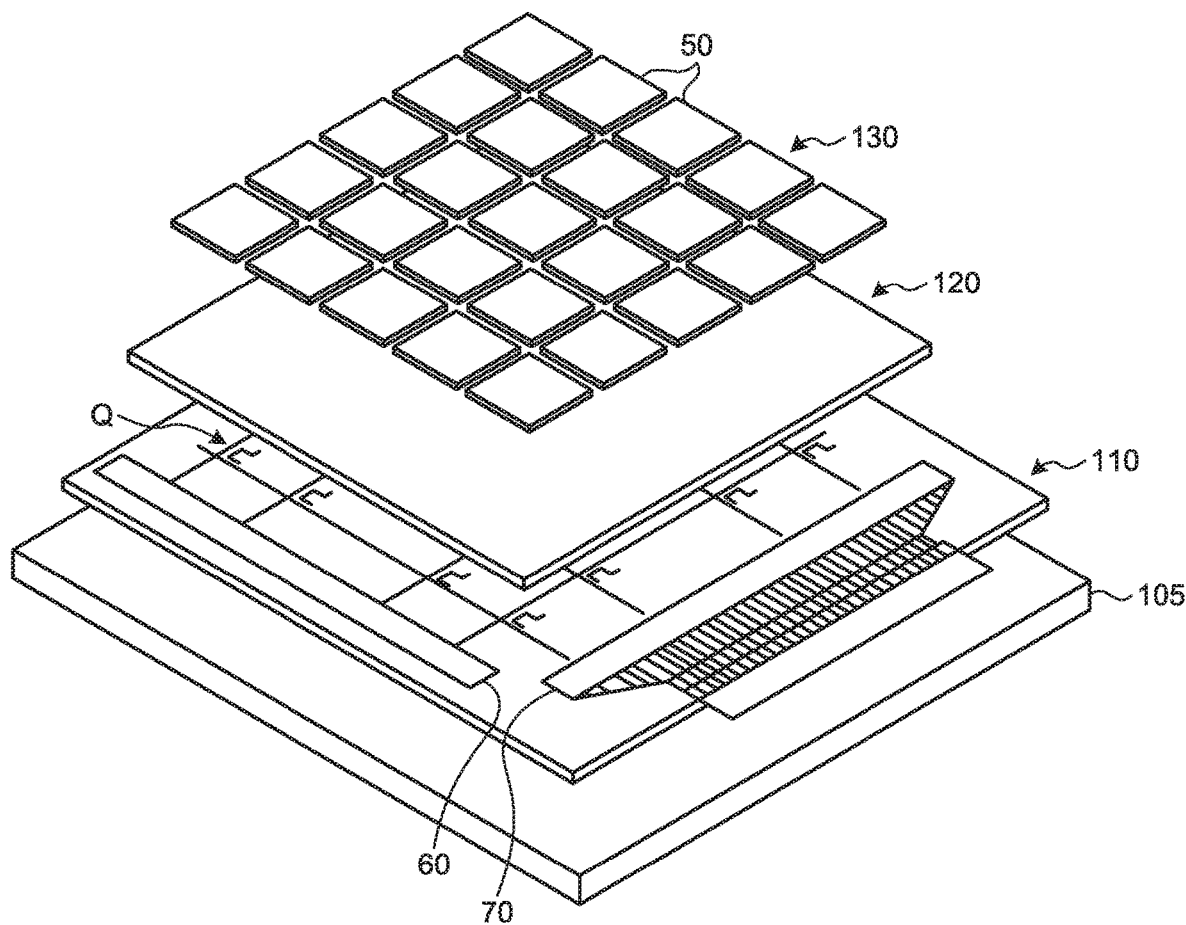
FIG. 5 is a schematic diagram of an example of a multilayered structure of the touch detecting apparatus illustrated in FIG. 1.

FIG. 5 is a schematic diagram of an example of a multilayered structure of the touch detecting apparatus 100 illustrated in FIG. 1. As illustrated in FIG. 5, the touch detecting apparatus 100 has a multilayered structure in which a thin-film transistor (TFT) layer 110, a shield electrode layer 120, and a touch detection electrode layer 130 are formed on a substrate 105, for example. The TFT layer 110 is provided with switching elements Q serving as switches SW1, for example. The shield electrode layer 120 is provided with a solid electrode serving as a shield electrode that suppresses electric waves of noise between the touch detection electrode layer 130 and the TFT layer 110. The touch detection electrode layer 130 is provided with a plurality of electrodes 50 arranged in a matrix in two directions (e.g., an x-direction and a y-direction) orthogonal to each other. The switching elements Q formed in the TFT layer 110 are coupled to the electrodes 50 via coupling portions, which are not illustrated, provided in the shield electrode layer 120. The coupling portions are provided in contact holes formed in the shield electrode layer 120, for example. The substrate 105 is a glass substrate, for example. The shield electrode layer 120 and the touch detection electrode layer 130 are made of indium tin oxide (ITO), for example. The specific configuration and the form of the components may be appropriately changed.

The electrodes 50 may be made of a metallic conductive material. In this case, the electrodes 50 are made of a metallic material including at least one of aluminum (Al), copper (Cu), silver (Ag), molybdenum (Mo), and an alloy of these metals. The electrodes 50 may be a multilayered body having a plurality of layers made of one or more of these metallic materials. In a case where the electrodes 50 are made of a metallic conductive material, they are preferably subjected to invisualization processing, such as mesh processing to form what is called a metal mesh structure and plating with a black material.

The touch detecting apparatus 100 according to the present embodiment includes m×q electrodes 50 arranged in a matrix of the x-direction and the y-direction. m and q are integers equal to or larger than 2. As described above, the touch detecting apparatus 100 includes a plurality of electrodes 50 that are aligned in at least one direction (e.g., two directions of the x- and the y-directions).

In the description of the present embodiment, the electrodes 50 aligned in the x-direction may be denoted by coordinates $x_1, x_2, \ldots,$ and $x_m$ indicating the respective positions. The electrodes 50 aligned in the y-direction may be denoted by coordinates $y_1, y_2, \ldots,$ and $y_q$ indicating the respective positions. The area that includes the m×q electrodes 50 and that can perform touch detection may be referred to as a detection area. The detection area corresponds to a detection surface covered with a dielectric on the upper side of the touch detection electrode layer 130, for example. When a touch operation is performed by an object (e.g., a finger of a person) in the detection area, the touch detecting apparatus 100 detects the touch operation. The thickness of the dielectric may be appropriately changed. In a case where the TFT layer 110 of the touch detecting apparatus 100 is provided in the same layer as that of a TFT layer 110 of a display device provided with the touch detecting apparatus 100, for example, the dielectric has a thickness corresponding to the distance between the TFT layer 110 and the touch detection surface included in a housing of the display device. Generally, as the thickness of the dielectric is thinner, the accuracy of touch detection increases.

Figure 6:
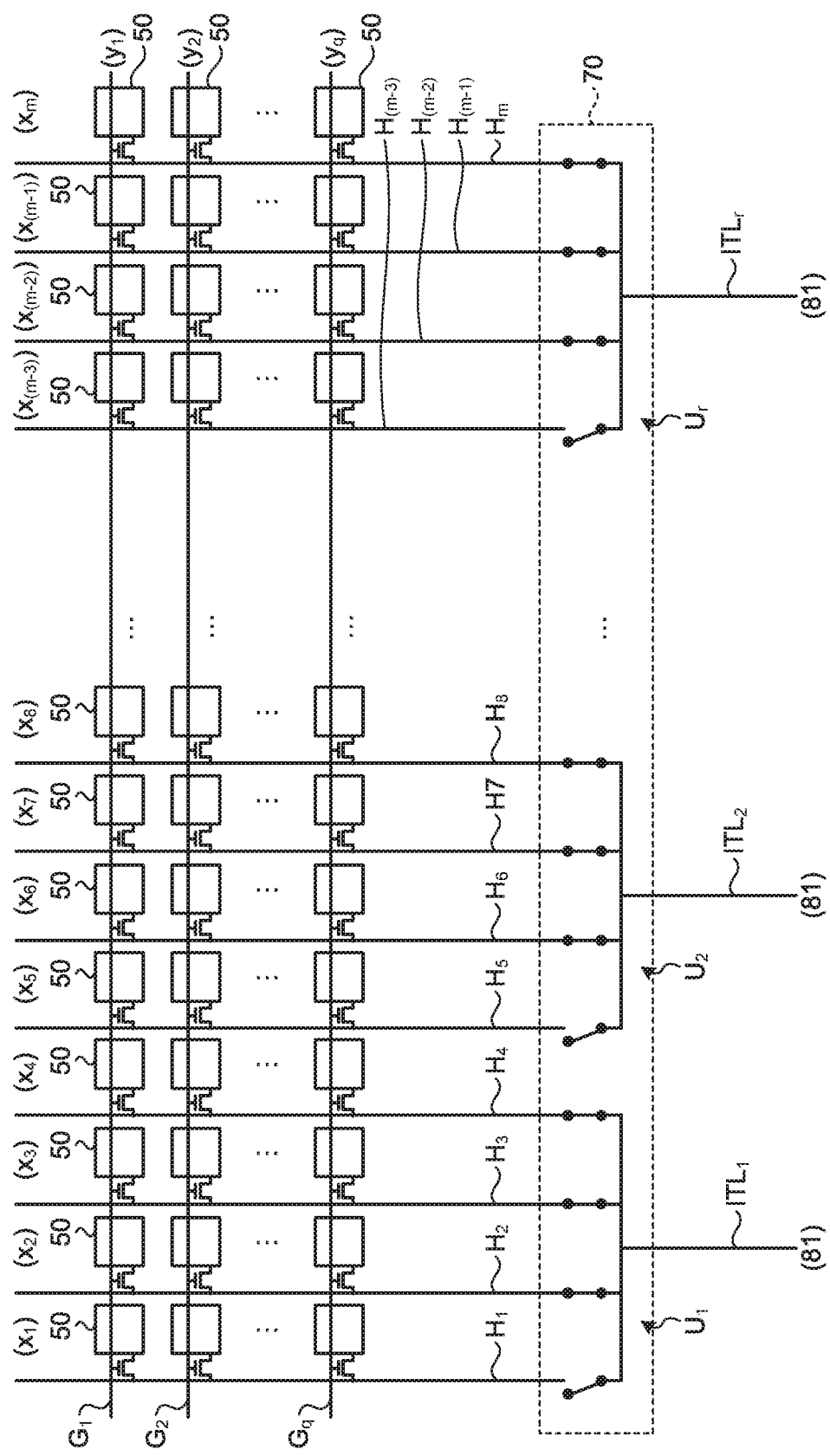
FIG. 6 is a schematic diagram illustrating a selector and detectors coupled to the selector.
Figure 7:
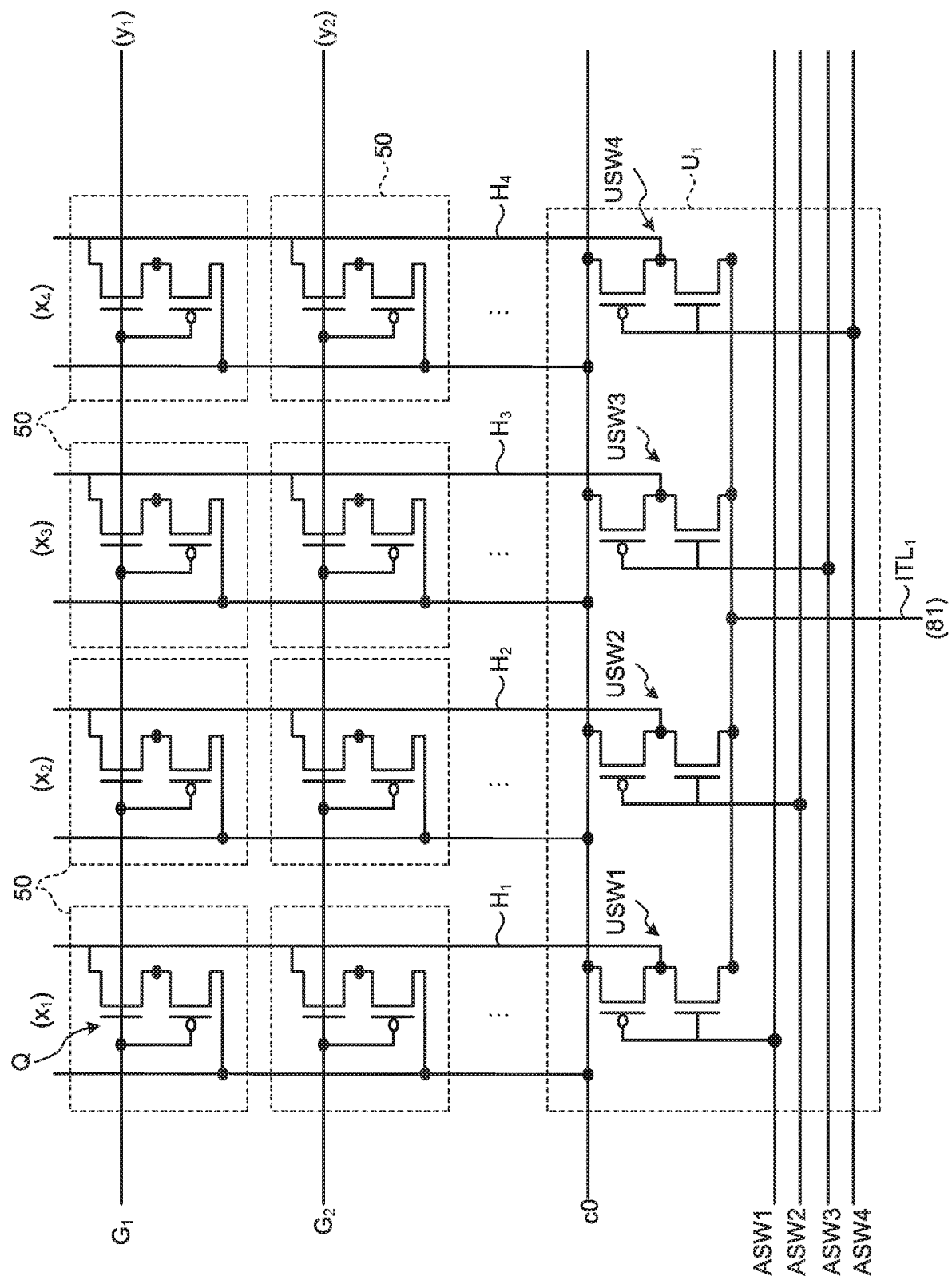
FIG. 7 is a schematic diagram illustrating an example of a circuit configuration relating to input and output in one switch unit.

FIG. 6 is a schematic diagram illustrating the selector 70 and the electrodes 50 coupled to the selector 70. FIG. 7 is a schematic diagram illustrating an example of a circuit configuration relating to input and output in one switch unit. FIG. 7 illustrates an example of a circuit configuration relating to input and output in a switch unit $U_1$ illustrated in FIG. 6. The touch detecting apparatus 100 includes scanning lines $G_1, G_2, \ldots,$ and $G_q$, detection signal lines $H_1, H_2, \ldots,$ and $H_m$, and wiring c0. The scanning lines $G_1, G_2, \ldots,$ and $G_q$ extend in the x-direction, for example. First ends of the scanning lines $G_1, G_2, \ldots,$ and $G_q$ are coupled to the drive driver 60, and the scanning lines $G_1, G_2, \ldots,$ and $G_q$ transmit a drive signal to the switching elements Q coupled to the electrodes 50. The scanning lines $G_1, G_2, \ldots,$ and $G_q$ are provided for the respective rows of the electrodes 50 aligned in the x-direction, for example. The number of scanning lines $G_1, G_2, \ldots,$ and $G_q$ corresponds to the number of electrodes 50 aligned in the y-direction. The detection signal lines $H_1, H_2, \ldots,$ and $H_m$ extend in the y-direction, for example. The detection signal lines $H_1, H_2, \ldots,$ and $H_m$ are coupled to the electrodes 50 via the switching elements Q coupled to the electrodes 50. First ends of the detection signal lines $H_1, H_2, \ldots,$ and $H_m$ are coupled to the selector 70. When coupled to the electrodes 50, the detection signal lines $H_1, H_2, \ldots,$ and $H_m$ couple the electrodes 50 to the selector 70. Input of the AC rectangular wave Sg to the electrodes 50 and output (e.g., output indicating the capacitance C3 (or C3+C4)) from the electrodes 50 are transmitted via the detection signal lines $H_1, H_2, \ldots,$ and $H_m$ and the selector 70 when the electrodes 50 are coupled to the detection signal lines $H_1, H_2, \ldots,$ and $H_m$. The wiring c0 is coupled to the electrodes 50 via the switching elements Q coupled to the electrodes 50. When the wiring c0 is coupled to the electrode 50, electric charges having the same potential as that of the AC rectangular wave Sg is supplied to the electrode 50.

While the wiring c0 is supplied with the electric charges having the same potential as that of the AC rectangular wave Sg to prevent noise generation based on capacitance formed between adjacent electrodes 50, the present invention is not limited thereto. The wiring c0 may be supplied with a predetermined electric potential, for example. In this case, the electric potential of the electrode 50 is reset to the predetermined electric potential at a timing when the electrode 50 is coupled to the wiring c0. As a result, touch detection is performed based on a change in the electric potential caused by proximity or the like of the object. The wiring c0 may be maintained at the predetermined electric potential by a circuit that supplies the predetermined electric potential, for example. Alternatively, the wiring c0 may be maintained at the predetermined electric potential by being in an electrically floating state.

The switching element Q switches the coupling destination of the electrode 50 depending on the presence or absence of the drive signal from the drive driver 60. Specifically, when the drive signal is not transmitted (turned low), the switching element Q couples the electrode 50 to the wiring c0, for example. By contrast, when the drive signal is transmitted (turned high), the switching element Q couples the electrode 50 to the detection signal line (one of the detection signal lines $H_1, H_2, \ldots,$ and $H_m$), for example.

The drive driver 60 outputs the drive signal for operating the switching elements Q coupled to the electrodes 50. Specifically, the drive driver 60 is a signal output circuit including what is called a shift register, for example. Based on clock signals supplied from the outside, the drive driver 60 outputs the drive signal while shifting the scanning lines $G_1, G_2, \ldots,$ and $G_q$ to be a target to which the drive signal is output in a predetermined cycle. The combination of the switching elements Q that operate at the same time in response to the drive signal corresponds to the shift pattern of the scanning lines $G_1, G_2, \ldots,$ and $G_q$ to which the drive driver 60 outputs the drive signal.

The drive driver 60 is provided with transmission paths through which a synchronization signal (CKV), a start pulse (STARTP), and a reset pulse (RESETP) are received. The drive driver 60 starts an operation at an input timing of the start pulse and shifts the scanning lines $G_1, G_2, \ldots,$ and $G_q$ to be a target to which the drive signal is output synchronously with a cycle (clock) of the synchronization signal. When receiving the reset pulse, the shift register in the drive driver 60 is returned to an initial state before the start of the operation. In the first embodiment, the touch detecting apparatus 100 includes a control circuit 65 serving as a dedicated circuit that outputs the synchronization signal (CKV), the start pulse (STARTP), and the reset pulse (RESETP). The component having the function of the control circuit 65 may be appropriately changed. The function of the control circuit 65 may be one function of the arithmetic circuit 83, for example.

The following describes the relation between the drive signal and the operating state of the switching element Q with reference to FIG. 4. The timings when the drive signal is not transmitted (turned low) correspond to time $T_{01}$ and time $T_{02}$, for example. The timings when the drive signal is transmitted (turned high) correspond to time $T_{11}$ and time $T_{12}$, for example. At the timing when the drive signal is transmitted (turned high), the electrode 50 is coupled to the detection signal line (one of the detection signal lines $H_1, H_2, \ldots,$ and $H_m$ via the switching element Q), thereby being coupled to the selector 70 coupled to the detection signal line. Output from the electrode 50 is transmitted to the selector 70 and input to the circuit 81 via the selector 70. If a signal transmission path in the selector 70 is established at the timing when the drive signal is transmitted (turned high), the same state is created as in the state where the switch SW2 is turned on. By contrast, if at least one of the following conditions is satisfied that the drive signal is not transmitted (turned low) or that the signal transmission path in the selector 70 is not established, the same state is created as in the state where the switch SW2 is turned off.

The selector 70 has a function to integrate outputs corresponding to the capacitances C3 (or C3+C4) output from the electrodes 50 via any one or more of the detection signal lines $H_1$, $H_2$, . . . , and $H_m$. Specifically, for example, the selector 70 includes switch units $U_1$, $U_2$, . . . , and $U_r$. Each of the switch units $U_1$, $U_2$, . . . , and $U_r$ includes three or more switches USW. A first end side (upstream side) of each of the switch units $U_1$, $U_2$, . . . , and $U_r$ is coupled to four detection signal lines included in the detection signal lines $H_1$, $H_2$, . . . , and $H_m$. The four detection signal lines are coupled to respective four electrodes 50 aligned in the x-direction via switches. Second end sides (downstream side) of the switch units $U_1$, $U_2$, . . . , and $U_r$ are coupled to integration lines $ITL_1$, $ITL_2$, . . . , $ITL_r$, respectively. Each of the integration lines $ITL_1$, $ITL_2$, . . . , $ITL_r$ is coupled to the circuit 81. With this configuration, each of the switch units $U_1$, $U_2$, . . . , and $U_r$ integrates outputs from the electrodes 50 received from the first end side. In the selector 70 according to the first embodiment, the number of pieces of wiring on the first end side is the same as the number (m) of the detection signal lines $H_1$, $H_2$, . . . , and $H_m$ coupled to the electrodes 50, and the number of pieces of wiring on the second end side is the same as the number (r) of the switch units $U_1$, $U_2$, . . . , and $U_r$. The number of pieces of wiring on the first end side of each of the switch units $U_1$, $U_2$, . . . , and $U_r$ is three or more. In other words, three or more electrodes 50 are coupled to one switch unit. The circuits 81 are provided for the respective switch units $U_1$, $U_2$, . . . , and $U_r$, for example. Alternatively, part or all of the witch units $U_1$, $U_2$, . . . , and $U_r$ may share one circuit 81. In this case, the touch detecting apparatus 100 may switch the switch unit sharing the one circuit 81 such that one switch unit that receives an output from the first end side is selected out of the switch unit and coupled to the one circuit 81.

The electrodes 50 aligned in the y-direction according to the first embodiment share one of the detection signal lines $H_1$, $H_2$, . . . , and $H_m$. One switch unit is provided for four detection signal lines coupled to respective four electrodes 50 aligned in the x-direction. More specifically, the switch unit $U_1$ includes four switching circuits (hereinafter referred to as switches) USW1, USW2, USW3, and USW4. The switches USW1, USW2, USW3, and USW4 switch between coupling and uncoupling of the four respective detection signal lines $H_1$, $H_2$, $H_3$, and $H_4$ coupled to the input side to and from the integration line $ITL_1$ on the output side. First ends of the switches USW1, USW2, USW3, and USW4 are coupled to the detection signal lines $H_1$, $H_2$, $H_3$, and $H_4$, respectively. A second end of each of the switches USW1, USW2, USW3, and USW4 is coupled to the integration line ITL1. The respective switches USW1, USW2, USW3, and USW4 are switched between an open state and a close state according to the presence/absence (ON/OFF) of an open-close signal received from open-close signal lines ASW1, ASW2, ASW3, and ASW4, for example. That is, each of the switches USW1, USW2, USW3, and USW4 is configured to be switched between a coupling mode (close state) and a decoupling mode (open state) according to the open-close signal. The coupling mode is a mode in which the detection signal line is coupled to the integration line $ITL_1$, and the decoupling mode is a mode in which the detection signal line is decoupled from the integration line $ITL_1$. When the switches USW1, USW2, USW3, and USW4 are in the coupling mode (close state), the respective detection signal lines $H_1$, $H_2$, $H_3$, and $H_4$ are coupled to the integration line $ITL_1$, and therefore the integration line $ITL_1$ is coupled to the electrodes 50 the outputs of which are transmitted via the respective detection signal lines $H_1$, $H_2$, $H_3$, and $H_4$. When the switches USW1, USW2, USW3, and USW4 are in the decoupling mode (open state), the respective detection signal lines $H_1$, $H_2$, $H_3$, and $H_4$ are decoupled from the integration line $ITL_1$, and therefore the integration line $ITL_1$ is decoupled from the electrodes 50 the outputs of which are transmitted via the respective detection signal lines $H_1$, $H_2$, $H_3$, and $H_4$. With this configuration, in the switch unit $U_1$ can optionally switch the detection signal lines $H_1$, $H_2$, $H_3$, and $H_4$ on the input side to be coupled to the integration line $ITL_1$ on the output side. In other words, the switch unit $U_1$ can optionally select outputs to be transmitted to the integration line $ITL_1$ on the output side and to be integrated, among outputs from the electrodes 50 coupled to the detection signal lines H1, H2, H3, and H4 on the input side. Similarly, the switch units $U_2$, $U_3$, . . . , and $U_r$ each include three or more switches (four switches, in this embodiment), and the open/close state of each switch is controlled according to the open-close signal such that the coupling state of the corresponding detection signal line and integration line.

Figure 8:
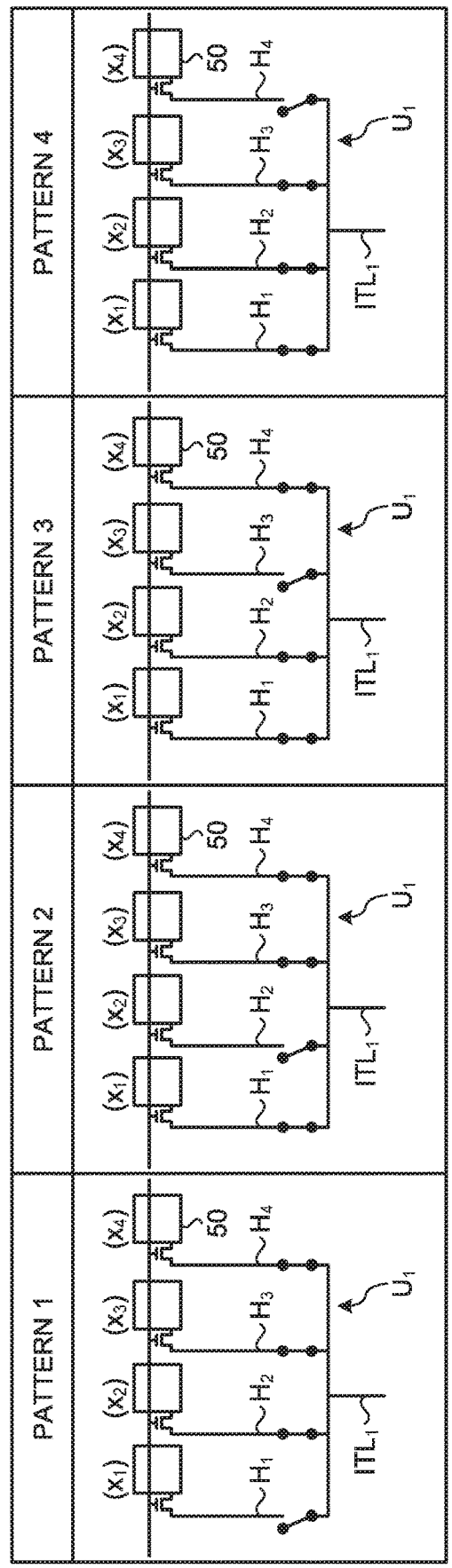
FIG. 8 is a diagram of an example of integration patterns of outputs from the detectors to be integrated by one switch unit.
Figure 9:
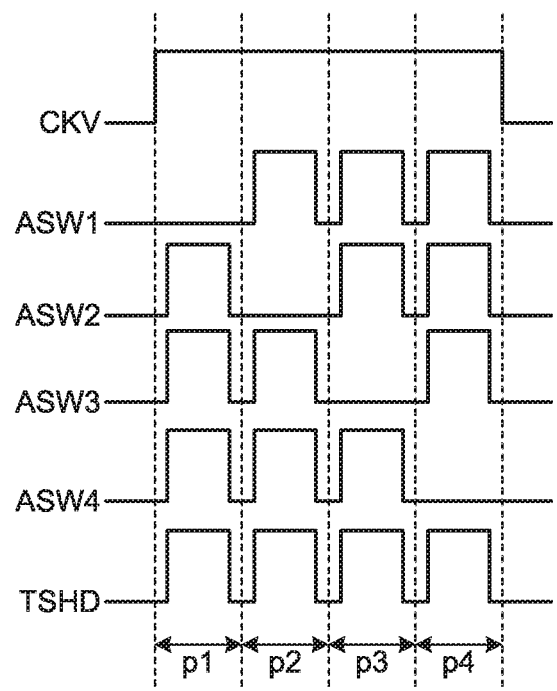
FIG. 9 is a diagram of an example of the relation between a scanning operation period to integrate outputs from the detectors, a synchronization signal, and output patterns of an open-close signal to open-close signal lines.

FIG. 8 is a diagram of an example of integration patterns of outputs from the electrodes 50 to be integrated by one switch unit. FIG. 9 is a diagram of an example of the relation between a scanning operation period to integrate the outputs from the electrodes 50, the synchronization signal CKV, and output patterns of the open-close signal to the open-close signal lines ASW1, ASW2, ASW3, and ASW4. FIG. 8 illustrates the integration patterns of outputs only in the relation between four electrodes 50 positioned at coordinates $x_1$, $x_2$, $x_3$, and $x_4$ and sharing one scanning line and one switch unit coupled to the four electrodes 50.

When the integration line is not coupled to one electrode 50 included in the electrodes 50 the outputs of which are transmitted via the detection signal lines coupled to the switch unit according to the first embodiment but is coupled to the other electrodes 50, the switch unit integrates outputs from the other electrodes 50. Specifically, as illustrated in FIG. 8, for example, in the switch unit $U_1$, when the integration line $ITL_1$ is not coupled to the electrode 50 at the coordinate $x_1$ included in the electrodes 50 at the coordinates $x_1$, $x_2$, $x_3$, and $x_4$ but is coupled to the electrodes 50 at the other coordinates ($x_2$, $x_3$, and $x_4$), outputs from the electrodes 50 at the other coordinates are transmitted (pattern 1). When the integration line $ITL_1$ is not coupled to the electrode 50 at the coordinate $x_2$ but is coupled to the electrodes 50 at the other coordinates ($x_1$, $x_3$, and $x_4$), outputs from the electrodes 50 at the other coordinates are transmitted (pattern 2). When the integration line $ITL_1$ is not coupled to the electrode 50 at the coordinate $x_3$ but is coupled to the electrodes 50 at the other coordinates ($x_1$, $x_2$, and $x_4$), outputs from the electrodes 50 at the other coordinates are transmitted (pattern 3). When the integration line $ITL_1$ is not coupled to the electrode 50 at the coordinate $x_4$ but is coupled to the electrodes 50 at the other coordinates ($x_1$, $x_2$, and $x_3$), outputs from the electrodes 50 at the other coordinates are transmitted (pattern 4). In other words, the switch unit $U_1$ according to the first embodiment integrates the outputs a plurality of times (e.g., four times) corresponding to at least the number of electrodes 50 coupled to the switch unit U$_1$ while changing the combination of the electrodes 50 the outputs of which are integrated.

In this disclosure, out of three or more electrodes (three or more detectors) coupled to three or more detection signal lines coupled to one switch unit, a switch in the open state (decoupling mode) may be referred to as a first type switch, an electrode 50 coupled to the first type switch may be referred to as a first type detector, a switch in the close state (coupling mode) may be referred to as a second type switch, and an electrode 50 coupled to the second type switch may be referred to as a second type detector. Further, an operation of excluding an output from the first type detector included and outputting, to the integration line, outputs from the second type detectors to be integrated may be referred to as output integration, or as integration of outputs. Thus, each of the detection signal lines is coupled to one or more of the detectors (electrodes 50) with which the detection signal line corresponds, and each of the detectors (electrode 50) is only coupled to one of the detection signal lines with which the detector corresponds. Further, the first type switch is one switch coupled to the first type detector, each of the second type switches is coupled to one or more of a plurality of second type detectors with which the second type switch corresponds, and each of the second type detectors is only coupled to one of the second type switches with which the second type detector corresponds.

As illustrated in FIG. 9, at a timing p1 of the pattern 1, the open-close signal is output to each of the open-close signal lines ASW2, ASW3, and ASW4, but no open-close signal is output to the open-close signal line ASW1. At a timing p2 of the pattern 2, the open-close signal is output to each of the open-close signal lines ASW1, ASW3, and ASW4, but no open-close signal is output to the open-close signal line ASW2. At a timing p3 of the pattern 3, the open-close signal is output to each of the open-close signal lines ASW1, ASW2, and ASW4, but no open-close signal is output to the open-close signal line ASW3. At a timing p4 of the pattern 4, the open-close signal is output to each of the open-close signal lines ASW1, ASW2, and ASW3, but no open-close signal is output to the open-close signal line ASW4. As described above, the open-close signal opens and closes the switches in the patterns illustrated in FIG. 8.

By changing the scanning lines G$_1$, G$_2$, ..., and G$_q$ to which the drive signal is output, the touch detecting apparatus 100 changes the electrodes 50 caused to operate in the y-direction. Specifically, by sequentially shifting the scanning lines to which the drive signal is output in the order of the scanning line G$_1$, the scanning line G$_2$, ..., and the scanning line G$_q$, for example, scanning is performed in the y-direction. As a result, the electrodes 50 caused to operate are sequentially shifted in the y-direction in the order of y$_1$, y$_2$, ..., and y$_q$, for example. In other words, in the first embodiment, 4×1 electrodes in the x- and the y-directions are handled as one group. When the integration line ITL$_1$ is not coupled to one electrode 50 (first type detector) included in the electrodes 50 in one group but is coupled to the other electrodes 50 (second type detectors), the outputs are transmitted. While the explanation has been made for the input and output operation of the switch unit U$_1$ with reference to FIGS. 8 and 9, the other switch units U$_2$, ..., and U$_r$ also operate in the same manner.

A switching clock signal TSHD corresponding to the open-close signal and the switching cycle of the presence of output in the patterns is output by the control circuit 65, for example. In other words, the control circuit 65 according to the present embodiment controls the switch unit U$_1$, U$_2$, ..., and U$_r$. More specifically, the control circuit 65 controls the output timings of the synchronization signal (CKV) and the start pulse (STARTP) to the drive driver 60 and the output timings of the open-close signal to the respective open-close signal lines ASW1, ASW2, ASW3, and ASW4. The control circuit 65 thus controls the operation timing of the drive driver 60 and the operation timing of the switch units U$_1$, U$_2$, ..., and U$_r$ in the selector 70. The switching clock signal TSHD is transmitted to the touch detection circuit 80 via the signal lines on the substrate 105 and the printed circuit board 85, for example. The switching clock signal TSHD is used for timing control in the processing performed by the touch detection circuit 80 according to the operations of the switch units U$_1$, U$_2$, ..., and U$_r$ described with reference to FIGS. 8 and 9.

The drive driver 60 and the selector 70 are circuits directly mounted on the TFT layer 110, for example. This is given as an example of a specific configuration of the drive driver 60 and the selector 70, and the present invention is not limited thereto. At least one of the drive driver 60 and the selector 70 may be provided as a driver integrated circuit (IC) and attached to wiring on the substrate 105.

The A/D converter 82 converts analog data output from the selector 70 into digital data and outputs it to the arithmetic circuit 83.

The arithmetic circuit 83 performs complementary processing based on the output from each of the switch units U$_1$, U$_2$, ..., and U$_r$ to calculate a detection result of one electrode 50 excluded in the output integration performed by a corresponding switch unit. The output from each of the switch units U$_1$, U$_2$, ..., and U$_r$ is an integrated output obtained by integrating outputs from a plurality of electrodes 50 excluding one electrode 50 included in a group of three or more electrodes 50 that detect a touch operation at the same time. The switch units U$_1$, U$_2$, ..., and U$_r$ in the selector 70 according to the first embodiment each output plural integrated outputs. The plural integrated outputs are obtained with the excluded electrode 50 varying from one another. The number of integrated outputs corresponds to the number of electrodes 50 included in the group of the electrodes 50. The arithmetic circuit 83 performs complementary processing based on the outputs from the switch units U$_1$, U$_2$, ..., and U$_r$ converted into digital data by the A/D converter 82.

Specifically, when N (N≥3) denotes the number of detectors (electrodes 50) coupled to one switch unit, the n+1-th (0≤n≤N−1) electrode 50 included in the N detectors (N electrodes 50) denotes the first type detector, detectors other than the first type detector included in the N detectors denote the second type detectors, and D$_n$ denotes the integrated output obtained by integrating outputs from the second type detectors, the arithmetic circuit 83 performs the complementary processing based on Expression (1) where N and n are integers:

$$I_n = \frac{\sum_{\substack{i=n \\ i \neq n}}^{N-1} D_i - (N-2)D_n}{N-1} \quad (1)$$

The detection result calculated using Expression (1) indicates a result of detection of a touch operation performed at the position corresponding to one electrode 50 not coupled to a corresponding integration line out of the integration lines ITL$_1$, ITL$_2$, ..., ITL$_r$ in the output integration performed by a corresponding switch unit out of the switch units $U_1$, $U_2$, . . . , and $U_r$. Specifically, in the example illustrated in FIG. 8, the arithmetic circuit 83 calculates the result of detection of a touch operation performed at the position corresponding to the electrode 50 at the coordinate $x_1$ based on the output of the pattern 1. Similarly to this, the arithmetic circuit 83 calculates the result of detection of a touch operation performed at the position corresponding to the electrode 50 at the coordinate $x_2$ based on the output of the pattern 2. The arithmetic circuit 83 calculates the result of detection of a touch operation performed at the position corresponding to the electrode 50 at the coordinate $x_3$ based on the output of the pattern 3. The arithmetic circuit 83 calculates the result of detection of a touch operation performed at the position corresponding to the electrode 50 at the coordinate $x_4$ based on the output of the pattern 4. As described above, the arithmetic circuit 83 serves as an arithmetic apparatus that performs complementary processing based on output (integrated output) integrated when a integration line is not coupled to one electrode 50 included in three or more electrodes 50 but is coupled to the other electrodes, thereby calculating the result of detection of proximity or contact of an object at the position of the one electrode 50. The three or more electrodes 50 are electrodes 50 included in a group of three or more electrodes 50 coupled to one switch unit, for example.

Figure 10:
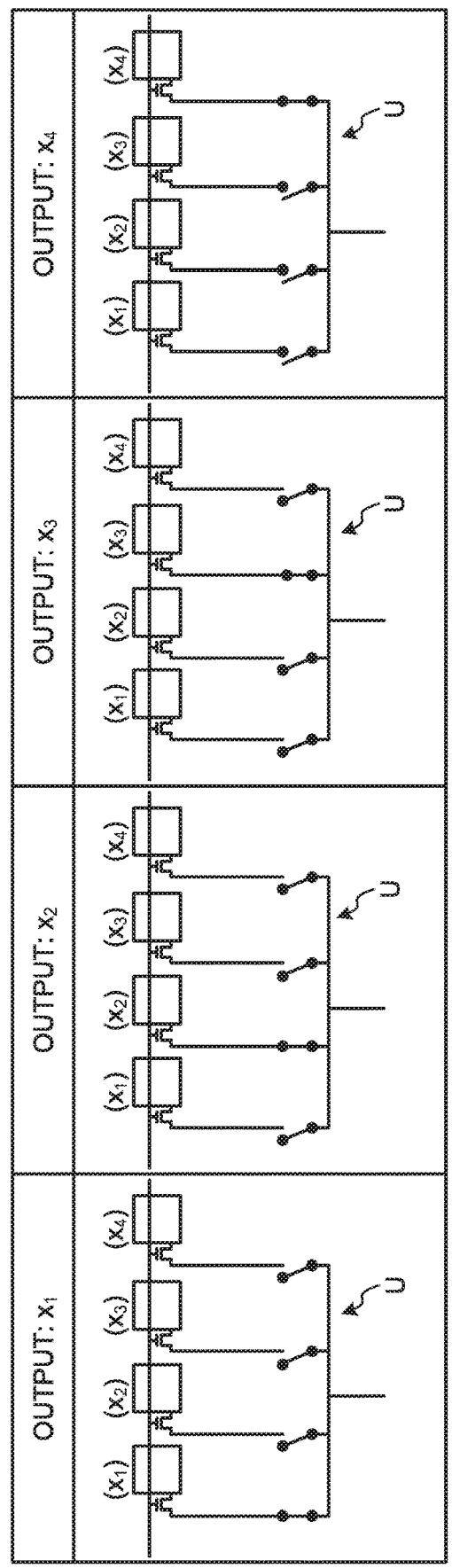
FIG. 10 is a diagram of coupling patterns (comparative example) in a case where output from each detector is not integrated with outputs from the other detectors.
Figures 11, 12:
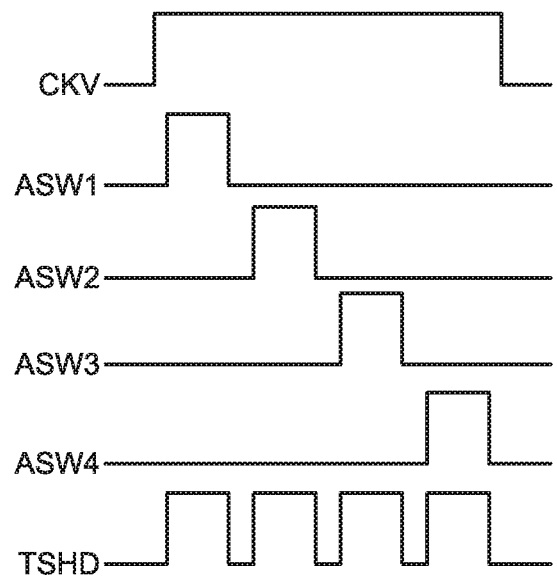
FIG. 11 is a diagram of an example of the relation between the scanning operation period, the synchronization signal, and the output patterns of the open-close signal to the open-close signal lines in the configuration illustrated in FIG. 10.
FIG. 12 is a table of the signal-noise ratio (S/N) of detection results and compares the first embodiment with the comparative example.

The following describes a comparative example where an output from each electrode 50 is not integrated with outputs from the other electrodes 50. FIG. 10 is a diagram of coupling patterns (comparative example) in a case where an output from each electrode 50 is not integrated with outputs from the other electrodes 50. In the comparative example, as illustrated in FIG. 10, a switch corresponding to one electrode 50 included in a plurality of electrodes 50 coupled to a switch unit U is coupled in the open state, but the other three switches corresponding to the other three electrodes 50 are in the close state. FIG. 11 is a diagram of an example of the relation between the scanning operation period, the synchronization signal, and the output patterns of the open-close signal to the open-close signal lines in the configuration illustrated in FIG. 10. In the comparative example, as illustrated in FIG. 11, an open-close signal is output to any one of the open-close signal lines ASW1, ASW2, ASW3, and ASW4, but no open-close signal is output to the other three open-close signal lines.

FIG. 12 is a table of the signal-noise ratio (S/N) of detection results and compares the first embodiment with the comparative example. As illustrated in FIG. 10, a case is assumed where the S/N in the detection results of the individual electrodes 50 obtained by using the outputs from the electrodes 50 at the respective coordinates $x_1$ to $x_4$ without any change is 100%. As illustrated in FIG. 12, the S/N increases to 119% when the complementary processing is performed based on the outputs indicating the detection results of the electrodes 50 excluding one electrode 50 included in the group of the electrodes 50. As described above, according to the first embodiment, it is possible to increase the S/N, thereby increasing the detection accuracy.

When σi denotes measurable noise generated in the outputs of the touch detection results from the respective electrodes 50, propagation noise (δn) generated in the integrated output of the electrodes 50 excluding one electrode 50 out of the N electrodes 50 is calculated by Expression (2). σ0 is a temporary value indicating the magnitude of the measurable noise generated in the outputs from the electrodes 50, and 0<σ0 is satisfied. In other words, σ0 is a constant indicating the magnitude of noise on the assumption that all the values of the measurable noises (σi) generated in the outputs from the electrodes 50 are equal.

$$\delta_n = \frac{\sqrt{\sum_{i \neq n}^{N-1} \sigma_i^2 + \{(N-2)\sigma_n\}^2}}{N-1} \cong \frac{\sqrt{(N-1)\sigma_0^2 + (N-2)^2\sigma_0^2}}{N-1} = \frac{\sqrt{N^2 - 3N + 3}}{N-1}\sigma_0 \quad (2)$$

The minimum value of the propagation noise (δn) can be calculated based on Expression (3). Based on Expression (3), it is found that the propagation noise (δn) is at the minimum when N=3 is satisfied.

$$\frac{d}{dN}\delta_n = \frac{1}{2}\frac{2N-3}{(N-1)\sqrt{N^2-3N+3}} - \frac{\sqrt{N^2-3N+3}}{(N-1)^2} = 0 \quad (3)$$

Figure 13:
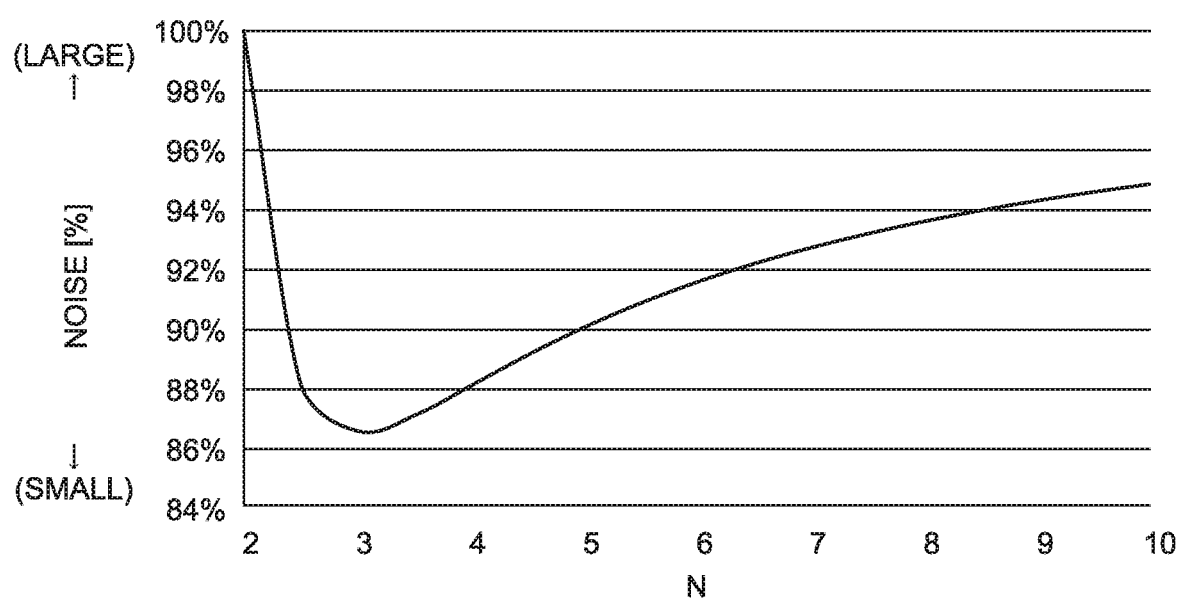
FIG. 13 is a graph indicating the relation between the number (N) of the detectors coupled to one switch unit and the magnitude of noise in the detection result of one detector obtained based on an integrated output of a plurality of detectors excluding the one detector out of N detectors.

FIG. 13 is a graph indicating the relation between the number (N) of the electrodes 50 coupled to one switch unit and the magnitude of noise in the detection result of one electrode 50 obtained based on the integrated output of the other electrodes 50 excluding the one electrode 50 out of the N electrodes 50. FIG. 13 indicates the relative magnitude of noise generated when N>2 is satisfied on the assumption that the magnitude of noise generated when N=2 is satisfied is 100%. As indicated by Expression (3) and FIG. 13, the noise is at the minimum when the number (N) of the electrodes 50 coupled to one switch unit is 3. When N is 4 or more, the noise is relatively smaller as N is closer to 3 than the case where N is larger.

Expression (4) is an equation used to calculate the propagation noise (δn) considering the correlation between the outputs from the electrodes 50. In Expression (4), $R_{00}$ is a temporary value of a coefficient (correlation coefficient) indicating the correlation between the outputs from the electrodes 50, and $0 < R_{00} < 1$ is satisfied. In other words, $R_{00}$ is a value obtained on the assumption that all the correlation coefficients are equal.

$$\delta_n = \frac{\sqrt{\left\{\sum_{i \neq n}^{N-1} \sigma_i - (N-2)\sigma_n\right\}^2}}{N-1}$$

$$\cong \frac{\sqrt{(N-1) + (N-2)^2 + 2\sum_{i \neq n}^{N-1}\sum_{j=i+1}^{N-1}\frac{\sigma_i\sigma_j}{\sigma_0^2} - 2(N-2)\sum_{i \neq n}^{N-1}\frac{\sigma_i\sigma_n}{\sigma_0^2}}}{N-1}\sigma_0$$

$$\cong \frac{\sqrt{(N-1) + (N-2)^2 + (N-1)(N-2)R_{00} - 2(N-2)(N-1)R_{00}}}{N-1}\sigma_0$$

$$= \frac{\sqrt{(N-1) + (N-2)^2 - (N-1)(N-2)R_{00}}}{N-1}\sigma_0$$

$$= \frac{\sqrt{N^2 - 3N + 3 - (N^2 - 3N + 2)R_{00}}}{N-1}\sigma_0 \quad (4)$$

$$= \frac{\sqrt{(1 - R_{00})(N^2 - 3N + 3) + R_{00}}}{N - 1} \sigma_0$$

Expression (4) indicates that the propagation noise (6n) decreases as the correlation coefficient ($R_{00}$) increases. In other words, as the degree of the correlation between the outputs from the electrodes 50 is higher, the noise decreases in the detection result of one electrode 50, the detection result being obtained based on the integrated output of the other electrodes 50 excluding the one electrode 50 out of the N electrodes 50.

Some methods for increasing the degree of the correction between the outputs from the electrodes 50 are known, including a method of obtaining the outputs from the electrodes 50 at the same time. If the outputs are obtained at the same time, various conditions relating to noise, such as the presence of causes that generate the noise, are assumed to be closer among the electrodes 50. All the outputs to be integrated by one switch unit according to the first embodiment correspond to the outputs from the electrodes 50 that perform touch detection at the same time. Consequently, the degree of the correlation between the outputs from the electrodes 50 coupled to one switch unit is extremely high.

The outputs from the electrodes 50 at the same time have a higher degree of correlation as the positions of the electrodes 50 are closer to each other. In consideration of an effect of external noise or the like, the difference in the wiring length between the detection signal lines provided between the individual electrodes 50 and one switch unit is preferably made smaller. The electrodes 50 coupled to one switch unit according to the present embodiment are determined based on the positional relation between three or more electrodes 50 and on the respective wiring lengths between the three or more electrodes 50 and the one switch unit. Specifically, three or more electrodes 50 arranged adjacent to each other are coupled to one switch unit. The respective wiring lengths of the detection signal lines between four electrodes 50 aligned in the x-direction and one switch unit are made equal or substantially equal. The lengths between each of the three or more detectors (electrodes 50) and the integration line are substantially equal. The three or more detection signal lines are substantially equal in length. While the three or more electrodes 50 arranged adjacent to each other may be four electrodes 50 aligned in the x-direction as illustrated in FIG. 8, for example, the present invention is not limited thereto.

Circuits serving as the A/D converter 82 and the arithmetic circuit 83 may be attached to wiring on the substrate 105, for example. Part or all of the functions of the A/D converter 82 and the arithmetic circuit 83 may be functions of an external circuit (e.g., a graphics processing unit (GPU)), such as the printed circuit board 85, coupled to the output side of the selector 70 via wiring. In this case, the touch detecting apparatus is not provided with the A/D converter 82 or the arithmetic circuit 83 and includes the selector 70 as its output terminal. The touch detecting apparatus and the external circuit constitute a touch detection system.

Figure 14:
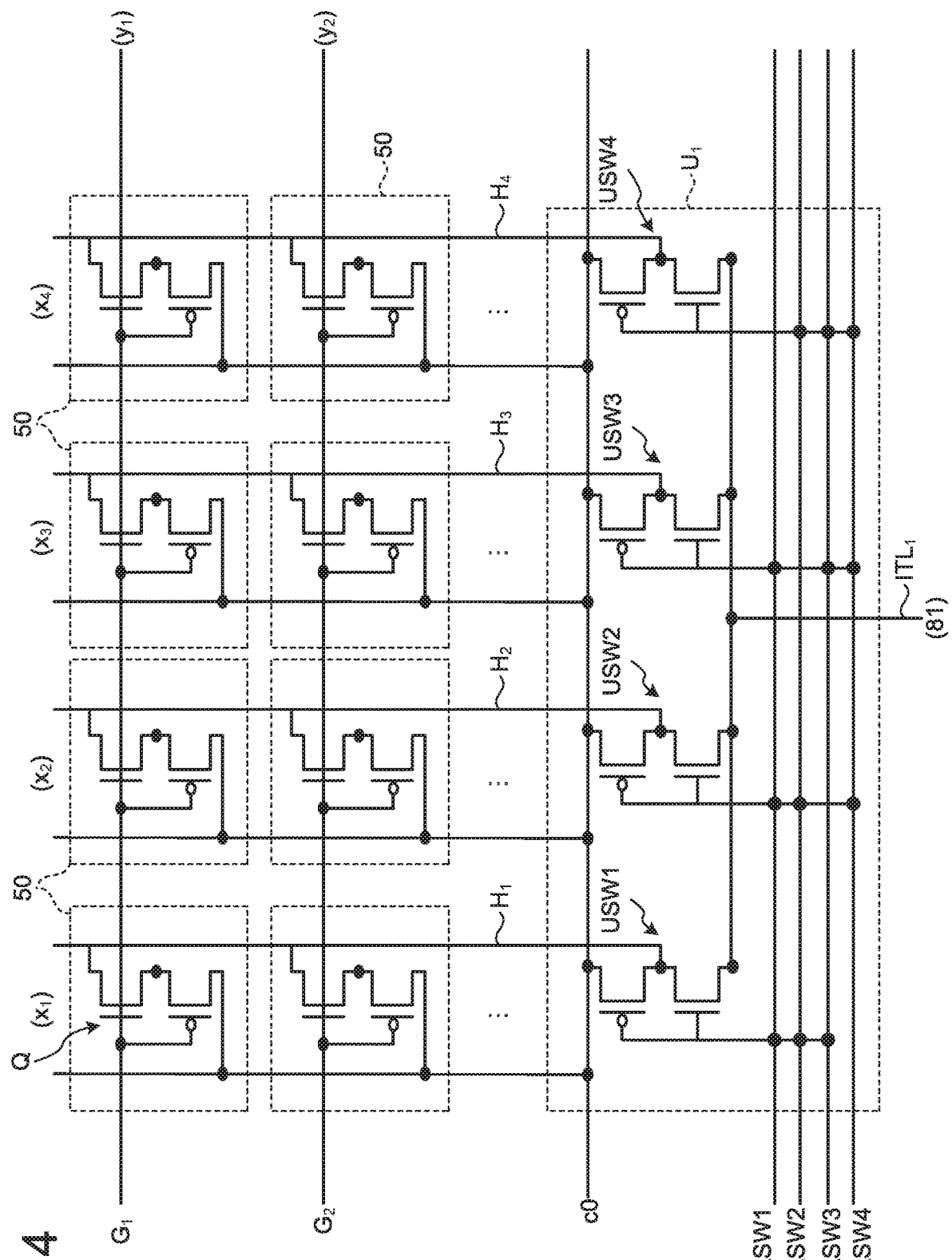
FIG. 14 is a schematic diagram illustrating another example of the circuit configuration relating to input and output in one switch unit.

FIG. 14 is a schematic diagram illustrating another example of the circuit configuration relating to input and output in one switch unit. While FIG. 7 illustrates an example of the coupling relation between the open-close signal lines ASW1, ASW2, ASW3, and ASW4 and the one switch unit (e.g., the switch unit Up to provide the integration patterns of outputs from the electrodes 50 illustrated in FIG. 8, the coupling relation is not limited to the example of FIG. 7. As illustrated in FIG. 14, for example, each of the open-close signal lines ASW1, ASW2, ASW3, and ASW4 may be coupled to switches excluding one switch out of three or more switches included in the switch unit $U_1$. In this case, by outputting the open-close signal to one of the open-close signal lines ASW1, ASW2, ASW3, and ASW4 as illustrated in FIG. 11, the touch detecting apparatus 100 can perform control so as to simultaneously set switches excluding one switch out of the three or more switches to be a coupled state and set the one switch to be a decoupled state.

In the example illustrated in FIG. 14, the open-close signal output to the open-close signal line ASW4 sets the state of the switches to the pattern 1 illustrated in FIG. 8. The open-close signal output to the open-close signal line ASW2 sets the state of the switches to the pattern 3 illustrated in FIG. 8. The open-close signal output to the open-close signal line ASW3 sets the state of the switches to the pattern 2 illustrated in FIG. 8. The open-close signal output to the open-close signal line ASW1 sets the state of the switches to the pattern 4 illustrated in FIG. 8.

Figure 15:
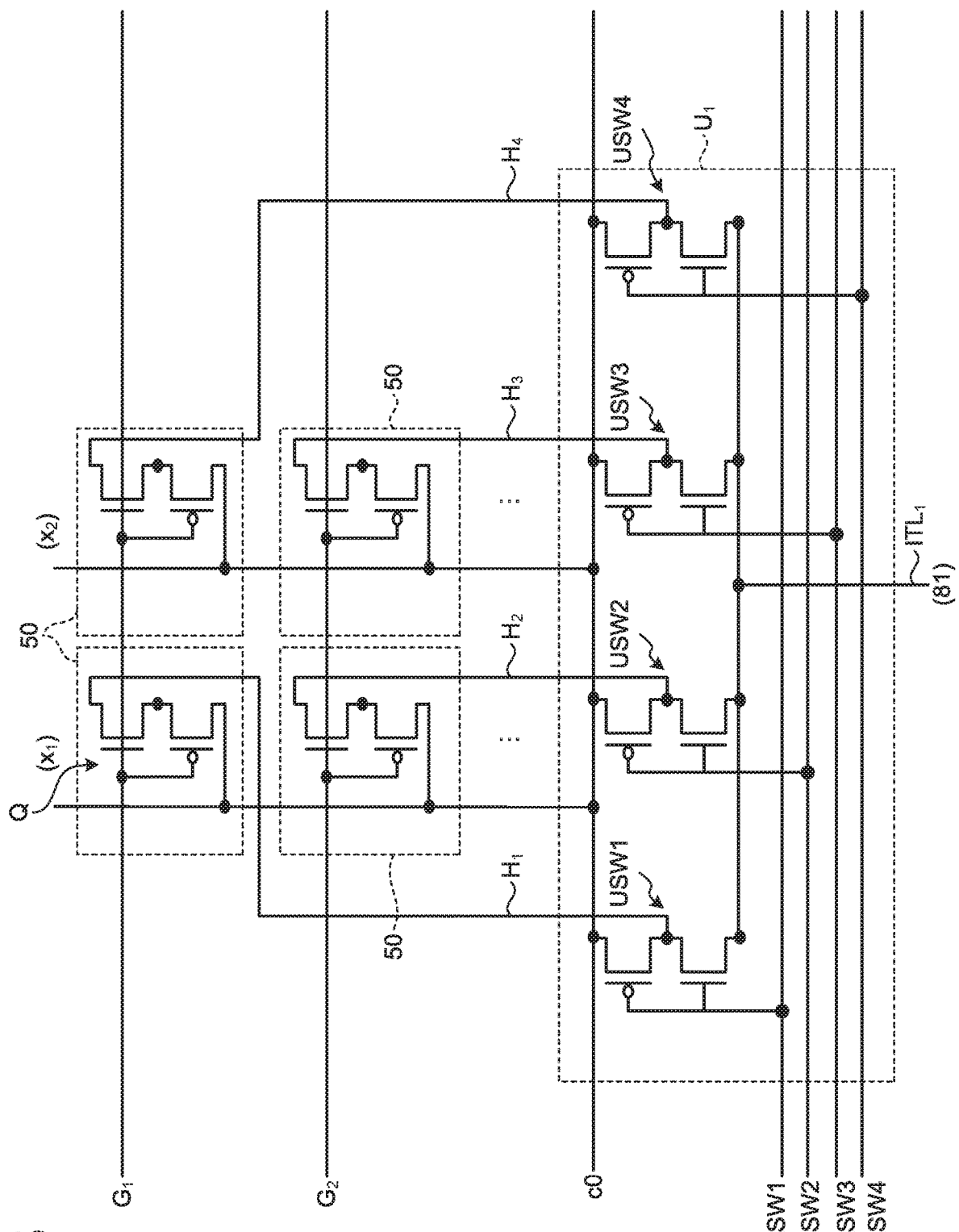
FIG. 15 is a schematic diagram illustrating still another example of the circuit configuration relating to input and output in one switch unit.

FIG. 15 is a schematic diagram illustrating still another example of the circuit configuration relating to input and output in one switch unit. The coupling relation between the electrodes 50 and one switch unit is not limited to that illustrated in FIG. 7 and may be appropriately changed. Specifically, 2×2 electrodes 50 in the x- and the y-directions, that is, four electrodes 50 in total may be handled as one group. In this case, the scanning lines (e.g., the scanning lines $G_1$ and $G_2$) receive the drive signal at the same time, the scanning lines being coupled to electrodes 50 of two rows including the electrodes 50 included in the same group in the x-direction. The electrodes 50 in one group are provided such that their output state (open and close) to one switch unit can be independently switched. Three or more detection signal lines coupled to one switch unit individually transmit the detection results of the three or more electrodes 50. Specifically, as illustrated in FIG. 15, for example, 2×2 electrodes 50, that is, four electrodes 50 in total can be coupled to one integration line $ITL_1$ via respective detection signal lines $H_1$, $H_2$, . . . , and respective switches. As described above, a plurality of electrodes 50 adjacent to each other in two directions of a first direction and a second direction different from the first direction may be coupled such that the outputs from the electrodes 50 are integrated. Electrodes 50 included in different groups may share the detection signal lines $H_1$, $H_2$, . . . . The width of the switch unit $U_1$ in the x-direction and the width of the electrodes 50 in the x-direction and the arrangement interval therebetween illustrated in FIG. 15 do not reflect the actual arrangement. FIG. 15 simply illustrates the difference in arrangement of the electrodes 50 coupled to the switch unit $U_1$ compared with the arrangement illustrated in FIG. 7.

The number of times of integration of the outputs from the electrodes 50 coupled to the switch unit $U_1$ corresponds to at least the number of electrodes 50 coupled to the switch unit $U_1$ and may be more than the number of electrodes 50 coupled to the switch unit $U_1$. The touch detecting apparatus 100, for example, may carry out the integration patterns 1 to 4 of the outputs from the four electrodes 50 illustrated in FIG. 8 twice or more. In this case, by performing detection based on the output integration carried out a plurality of times, the touch detecting apparatus 100 can increase the accuracy of touch detection. That is, the control circuit 65 can controls the switches USW of the switch unit $U_1$ to control the number of times the output integration is performed.

The touch detecting apparatus 100 does not necessarily perform, at consecutive timings, outputs corresponding to a plurality of patterns (refer to FIG. 8, for example) generated in integration of the outputs from the electrodes 50 coupled to one switch unit. The touch detecting apparatus 100, for example, may carry out the output integration of all the patterns by: sequentially carrying out the output integration of any one of the patterns 1 to 4 illustrated in FIG. 8 while shifting the target line in a scanning direction (e.g., the y-direction) and sequentially carrying out the integrated output of the other patterns in the same manner while shifting the target line in the scanning direction. The touch detecting apparatus 100, however, preferably performs the process of consecutively integrating the outputs from the electrodes 50 coupled to one switch unit a plurality of times corresponding to at least the number of electrodes 50 coupled the switch unit rather than the shift process of performing scanning in each pattern. This is because the consecutive process can reduce a change in conditions among the patterns. The conditions among the patterns are the relation between the object to be detected and the electrodes 50, noise, and other conditions.

As described above, when an corresponding integration line is not coupled to one electrode 50 (the first type detector) included in the electrodes 50 the outputs of which are transmitted via detection signal lines coupled to one switch unit but is coupled to the other electrodes 50 (the second type detectors), the one switch unit integrates outputs from the other electrodes 50 (the second type detectors). As a result, it is possible to obtain an output (integrated output) that enables more accurate calculation of the detection result of the decoupled electrode 50 (the first type detector). The switch units $U_1$, $U_2$, . . . , and $U_r$ each integrate the outputs a plurality of times corresponding to the number of electrodes 50 while changing the combination of the electrodes 50 the outputs of which are integrated. Consequently, the first embodiment can obtain the integrated output of all the electrodes 50.

The electrodes 50 are arranged in a matrix in two directions orthogonal to each other. With this configuration, it is possible to obtain at least two-dimensional information on the detected object.

The number of electrodes 50 coupled to one switch unit is three. With this configuration, it is possible to obtain an output (integrated output) that enables more accurate calculation of the detection results of the electrodes 50.

The present embodiment describes an example where a plurality of electrodes 50 adjacent to each other in at least one direction (e.g., at least one of the x- and the y-directions) are provided such that each of the switch units $U_1$, $U_2$, . . . , and $U_r$ integrates the outputs therefrom. By determining the electrodes 50 to be coupled to one switch unit based on the positional relation between three or more electrodes 50 and on the wiring length between the switch unit and the three or more electrodes 50, it is possible to enhance the degree of the correlation between the three or more electrodes 50 coupled to one switch unit. As a result, it is possible to obtain an output (integrated output) that enables more accurate calculation of the detection results of the electrodes 50. Alternatively, electrodes 50 aligned adjacent to each other in two directions (e.g., the x- and the y-directions) may be coupled to the switch unit. The two directions are not necessarily orthogonal to each other and simply need to be different from each other. It is preferable that the difference in the wiring length between three or more detection signal lines coupled to one switch unit out of all the detection signal lines $H_1$, $H_2$, . . . , and $H_r$ be small.

In other words, the standard deviation of the wiring length of wiring provided between the three or more detectors coupled to one switch unit and the switch unit is preferably 0 or a small value closer to 0. The electrodes 50, for example, correspond to detectors. Part or all of the detection signal lines $H_1$, $H_2$, . . . , and $H_r$, for example, correspond to wiring provided between the detectors and a switch unit. In a case where two or more switch units are provided, the combinations of the detectors coupled to the respective switch units are determined so as to minimize the variations in the length of wiring provided between a plurality of detectors to be coupled to one switch unit and the switch unit, for example.

The complementary processing is performed based on the output integrated in a state where the integration line is not coupled to one electrode 50 included in the three or more electrodes 50 but is coupled to the other electrodes 50, thereby calculating the detection result of the electrode 50. Consequently, it is possible to obtain the detection result of the electrode 50 with higher accuracy.

Second Embodiment

Figure 16:
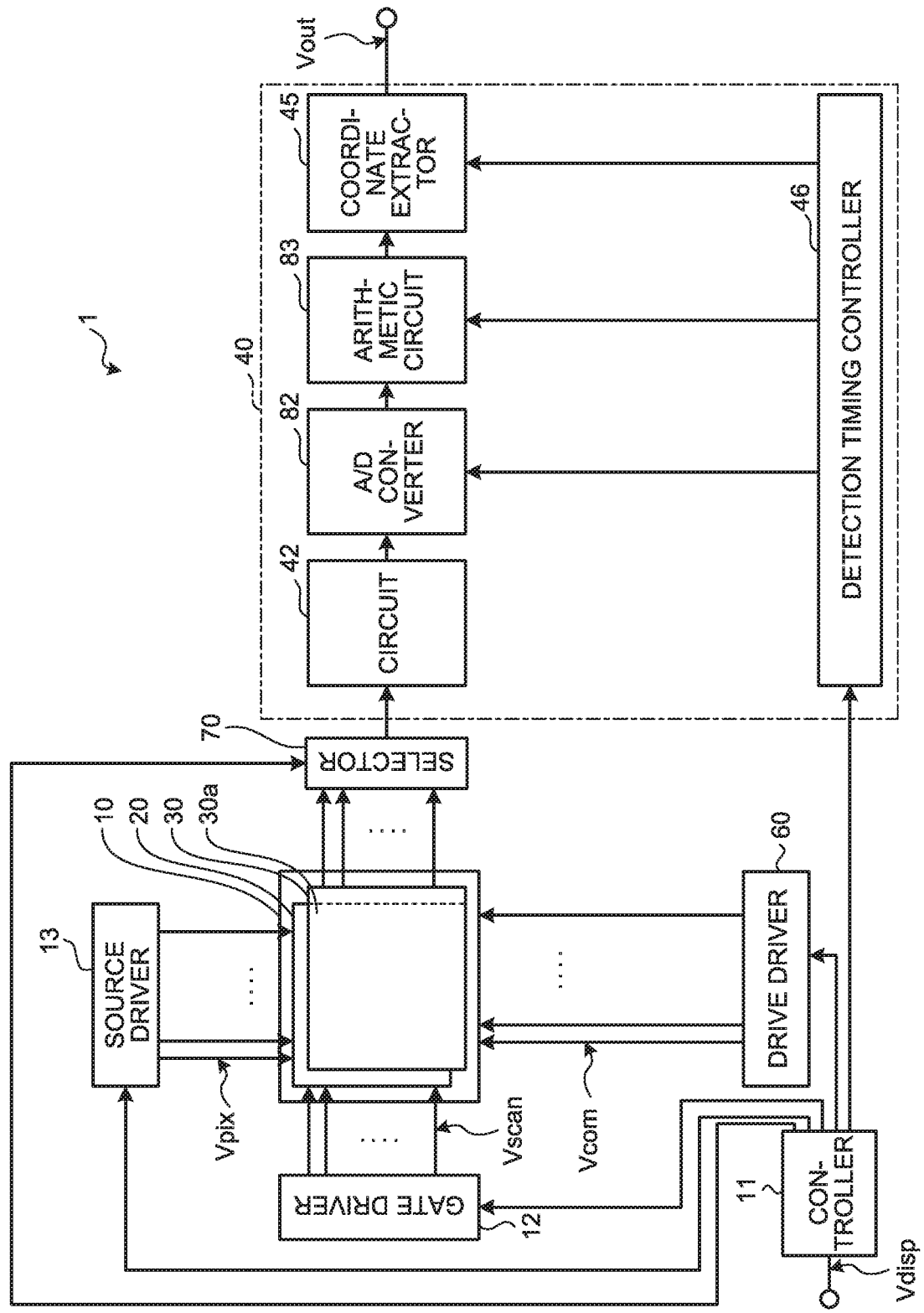
FIG. 16 is a block diagram of an exemplary configuration of a display apparatus with a touch detection function according to a second embodiment.

FIG. 16 is a block diagram of an exemplary configuration of a display apparatus with a touch detection function according to a second embodiment. A display apparatus with a touch detection function 1 includes a display device with a touch detection function 10, a controller 11, a gate driver 12, a source driver 13, the drive driver 60, and a touch detection circuit 40. The display apparatus with a touch detection function 1 is a display apparatus including the display device with a touch detection function 10 having a touch detection function. The display device with a touch detection function 10 is what is called an in-cell device in which a display panel 20 is integrated with a touch panel 30. The display panel 20 includes liquid crystal display elements serving as display elements. The touch panel 30 serves as a touch operation detecting device and detects input by a touch operation. The display device with a touch detection function 10 may be what is called an on-cell device in which the touch panel 30 is mounted on the display panel 20. The display panel 20 may be an organic electroluminescent (EL) display panel, for example. The controller 11 of the second embodiment also functions as the control circuit 65 of the first embodiment.

The gate driver 12 has a function to sequentially select one horizontal line to be a target of display drive in the display device with a touch detection function 10 based on a control signal supplied from the controller 11.

The display device with a touch detection function 10 includes a plurality of sub-pixels SPix. The source driver 13 is a circuit that supplies a pixel signal Vpix to the sub-pixel SPix based on a control signal supplied from the controller 11 (refer to FIG. 22 and other figures). Specifically, the source driver 13 includes switching elements and common wiring, for example. The switching elements are coupled to individual signal lines SGL. The common wiring is coupled to the switching elements and transmits the pixel signals Vpix under the control of the controller 11. By sequentially switching the switching elements coupled to the common wiring, the source driver 13 selectively supplies the pixel signals Vpix to the signal lines SGL in a time-division manner.

Figure 20:
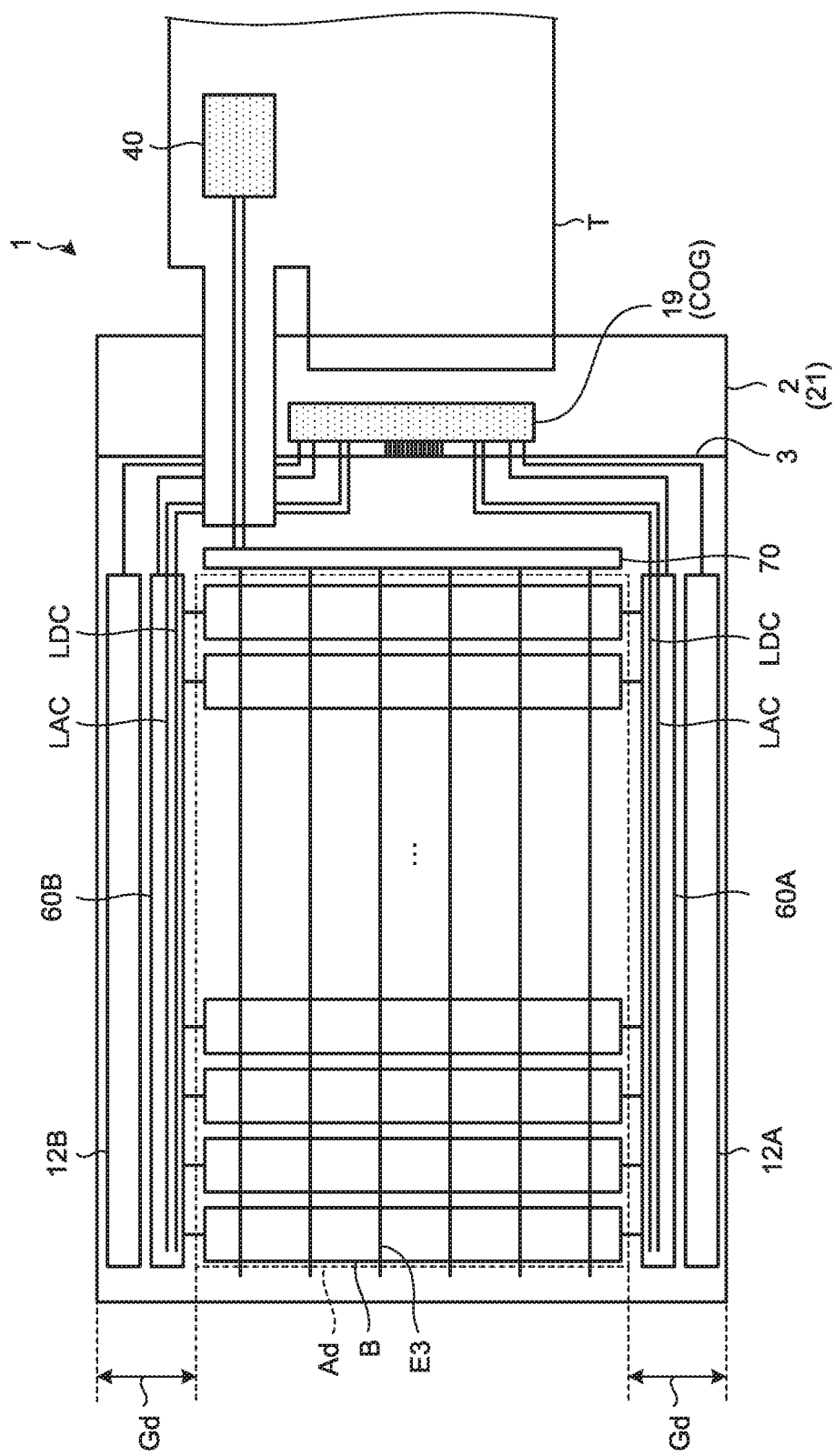
FIG. 20 is a diagram of an example of a module provided with the display apparatus with a touch detection function.

The drive driver 60 includes drive driver circuits 60A and 60B (refer to FIG. 20 and other figures). The drive driver circuits 60A and 60B each supply a drive signal Vcom to drive electrodes COML, which will be described later, of the display device with a touch detection function 10 based on control signals supplied from the controller 11.

The display panel 20 is a display element that performs display by sequentially scanning each horizontal line based on a scanning signal Vscan supplied from the gate driver 12, which will be described later. The controller 11 is a circuit that supplies control signals to the gate driver 12, the source driver 13, the drive driver 60, and the touch detection circuit 40 based on video signals Vdisp supplied from the outside. The controller 11 performs control such that the drivers and the circuit described above operate synchronously with one another.

The touch detection circuit 40 determines whether a touch operation is performed on the touch panel 30 based on a control signal supplied from the controller 11 and on a touch detection signal Vdet1 supplied from the touch panel 30. If a touch operation is performed, the touch detection circuit 40 derives the coordinates or the like of the touch operation in a touch portion 30a. The touch detection circuit 40 includes a circuit 42, the A/D converter 82, the arithmetic circuit 83, a coordinate extractor 45, and a detection timing controller 46.

Figure 17:
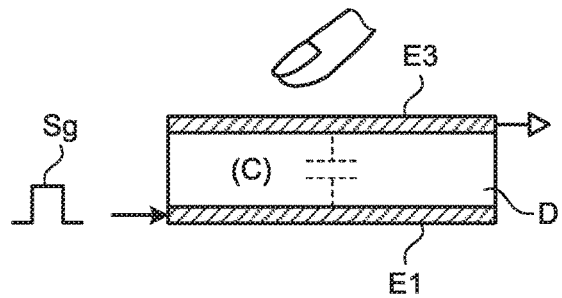
FIG. 17 is a diagram for explaining a basic principle of mutual capacitive touch detection and illustrates a state where a finger is neither in contact with nor in proximity to a touch detection electrode.
Figure 18:
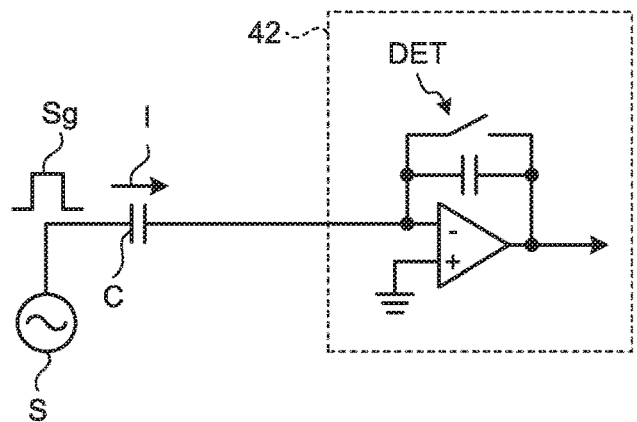
FIG. 18 is a diagram for explaining an example of an equivalent circuit in the state where a finger is neither in contact with nor in proximity to the touch detection electrode as illustrated in FIG. 17.
Figure 19:
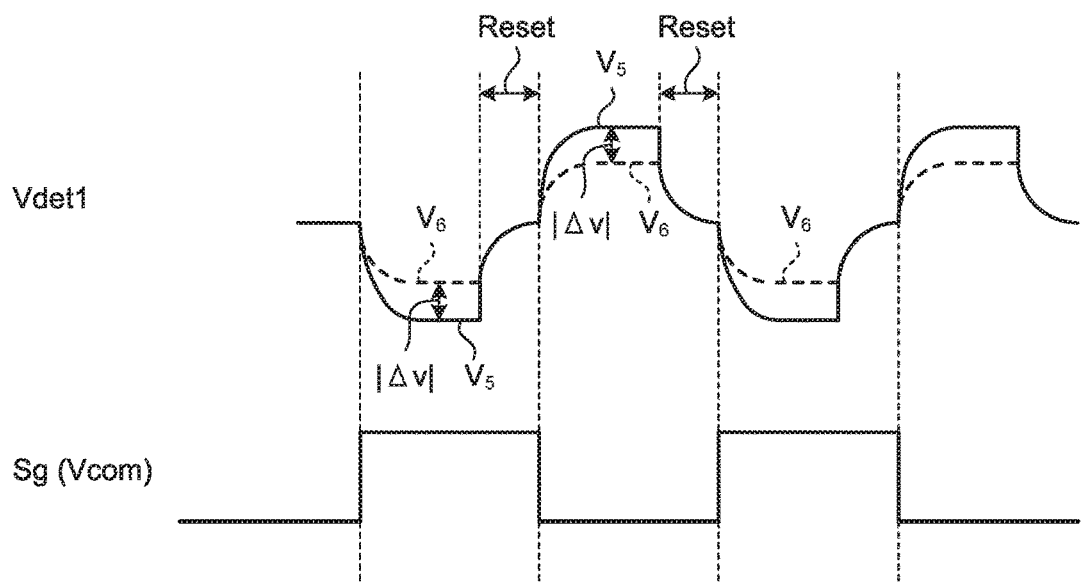
FIG. 19 is a diagram of an example of waveforms of a drive signal and a touch detection signal.

The touch panel 30 operates based on a basic principle of capacitive touch detection. The following describes a basic principle of mutual capacitive touch detection in a touch detection mode of the display apparatus with a touch detection function 1 according to the second embodiment with reference to FIGS. 17 to 19. FIG. 17 is a diagram for explaining the basic principle of mutual capacitive touch detection and illustrates a state where a finger is neither in contact with nor in proximity to a touch detection electrode. FIG. 18 is a diagram for explaining an example of an equivalent circuit in the state where a finger is neither in contact with nor in proximity to the touch detection electrode as illustrated in FIG. 17. FIG. 19 is a diagram of an example of waveforms of a drive signal and a touch detection signal. While the following describes a case where a finger is in contact with or in proximity to the touch detection electrode, the external proximate object is not limited to a finger and may be a device including a conductor, such as a stylus.

As illustrated in FIG. 17, for example, a capacitance element C includes a pair of electrodes, that is, the drive electrode E1 and the touch detection electrode E3 facing each other with a dielectric D interposed therebetween. As illustrated in FIG. 18, a first end of the capacitance element C is coupled to an AC signal source (drive signal source) S, whereas a second end thereof is coupled to a voltage detector DET of the circuit 42. The voltage detector DET is an integration circuit included in the circuit 42 illustrated in FIG. 17, for example.

When the AC signal source S applies an AC rectangular wave Sg having a predetermined frequency (e.g., approximately several kilohertz to several hundred kilohertz) to the drive electrode E1 (first end of the capacitance element C), an output waveform (touch detection signal Vdet1) illustrated in FIG. 19 is generated via the voltage detector DET coupled to the touch detection electrode E3 (second end of the capacitance element C). The AC rectangular wave Sg corresponds to the drive signal Vcom input from the drive driver 60.

In a state where a finger is not in contact with (or in proximity to) the touch detection electrode (non-contact state), an output (electric current I) depending on the capacitance value of the capacitance element C flows with charge and discharge of the capacitance element C as illustrated in FIGS. 17 and 18. As illustrated in FIG. 19, the voltage detector DET converts change in the electric current I depending on the AC rectangular wave Sg into change in voltage (waveform $V_5$ indicated by the solid line).

By contrast, in a state where a finger is in contact with (or in proximity to) the touch detection electrode (contact state), capacitance formed by the finger is in contact with or in proximity to the touch detection electrode E3. In this state, fringe capacitance between the drive electrode E1 and the touch detection electrode E3 is blocked. As a result, the capacitance element C acts as a capacitance element having a capacitance value smaller than that of the capacitance element C in the non-contact state. This configuration allows the flow of an electric current I that changes depending on the variation of the capacitance element C. As illustrated in FIG. 19, the voltage detector DET converts change in the electric current I depending on the AC rectangular wave Sg into change in voltage (waveform $V_6$ indicated by the dotted line). In this case, the waveform $V_6$ has amplitude smaller than that of the waveform $V_5$. An absolute value $|\Delta v|$ of the voltage difference between the waveform $V_5$ and the waveform $V_6$ varies depending on an effect of an external conductor, such as a finger, in proximity to the touch detection electrode. To accurately detect the absolute value $|\Delta v|$ of the voltage difference between the waveform $V_5$ and the waveform $V_6$, the voltage detector DET preferably operates having a period Reset for resetting charge and discharge of a capacitor based on the frequency of the AC rectangular wave Sg by switching in the circuit.

The touch panel 30 illustrated in FIG. 16 sequentially scans each of detection blocks based on the drive signal Vcom supplied from the drive driver 60, thereby performing touch detection in the touch portion 30a by the mutual capacitive method.

The touch panel 30 generates the output (electric current I) depending on the capacitance value of the capacitance element C from the touch detection electrode E3 and supplies it to the selector 70. The selector 70 includes a plurality of switch units. The input side of each of the switch units is coupled to three or more touch detection electrodes, and the output side thereof is coupled to an integration line. When the switch unit is not coupled to one touch detection electrode E3 (first type detector) included in the touch detection electrodes E3 but is coupled to the other touch detection electrodes E3 (second type detectors), the switch unit integrates respective outputs from the second type detectors and outputs the integrated output to the circuit 42. The circuit 42 includes the voltage detector DET illustrated in FIG. 18, for example, and outputs the touch detection signal Vdet1 depending on the received electric current I. The touch detection signal Vdet1 is voltage depending on the electric current I, for example.

A touch detection signal amplifier may be provided between the circuit 42 and the A/D converter 82. In this case, the touch detection signal amplifier amplifies the touch detection signal Vdet1 supplied from the circuit 42 in mutual capacitive touch detection. An analog low-pass filter (LPF) may be provided between the circuit 42 and the A/D converter 82. The analog LPF removes high-frequency components (noise components) included in the touch detection signal Vdet1 and outputs the remaining components.

The A/D converter 82 samples the analog signal from the circuit 42 at a timing synchronized with the drive signal Vcom, thereby converting the analog signal into a digital signal.

The arithmetic circuit 83 performs complementary processing based on the output (integrated output) from the selector 70 to calculate a detection result of the touch detection electrode E3 excluded in the integrated output by being decoupled from the switch unit.

The arithmetic circuit 83 may include a digital filter that reduces frequency components (noise components) that are included in the output signal from the A/D converter 82 and have frequencies other than the frequency at which the drive signal Vcom is sampled. In this case, the arithmetic circuit 83 includes a logic circuit that determines whether a touch operation is performed on the touch panel 30 based on the output signals from the A/D converter 82. The arithmetic circuit 83 performs processing of extracting only the difference between the detection signals caused by a finger. The signal of difference caused by a finger corresponds to the absolute value |ΔV| of the difference between the waveform $V_5$ and the waveform $V_6$. The arithmetic circuit 83 may perform an arithmetic operation for averaging the absolute values |ΔV| per detection block, thereby calculating the average of the absolute value |ΔV|. With this operation, the arithmetic circuit 83 can reduce an effect of noise. The arithmetic circuit 83 compares the detected signal of difference caused by a finger with predetermined threshold voltage. If the signal of difference is lower than the threshold voltage, the arithmetic circuit 83 determines that an external proximate object is in the non-contact state. By contrast, if the signal of difference is equal to or higher than the threshold voltage, the arithmetic circuit 83 determines that an external proximate object is in the contact state. The touch detection circuit 40 thus can perform touch detection.

The coordinate extractor 45 is a logic circuit that derives, when the arithmetic circuit 83 detects a touch operation, the touch panel coordinates of the touch operation. The detection timing controller 46 performs control such that the A/D converter 82, the arithmetic circuit 83, and the coordinate extractor 45 operate synchronously with one another. The coordinate extractor 45 outputs the touch panel coordinates as detection signal output Vout.

FIG. 20 is a diagram of an example of a module provided with the display apparatus with a touch detection function. As illustrated in FIG. 20, the display apparatus with a touch detection function 1 includes a pixel substrate 2 (first substrate 21) and a printed circuit board T. The pixel substrate 2 (first substrate 21) is provided with a chip on glass (COG) 19 and has a display area Ad of the display panel 20 and a frame Gd. The COG 19 is a chip of an integrated circuit (IC) driver mounted on the first substrate 21 and provided with functions required for a display operation, such as the controller 11 illustrated in FIG. 16. The source driver 13 according to the present embodiment is included in the COG 19. Alternatively, the source driver 13 may be provided on the first substrate 21. The drive driver circuits 60A and 60B serving as components of the drive driver 60 are provided at the first substrate 21. Gate drivers 12A and 12B serving as components of the gate driver 12 are provided at the first substrate 21. The display apparatus with a touch detection function 1 may include circuits, such as the drive driver circuits 60A and 60B and the gate driver 12, in the COG 19. The COG 19 is given just as an example of a mounting technology, and the present invention is not limited thereto. The chip of the IC driver may be mounted on the printed circuit board T, for example. Alternatively, a component having the same functions as those of the COG 19 may be provided as a chip on film or a chip on flexible (COF). The COG 19 includes the control circuit 65 of the first embodiment. The control circuit 65 may be provided at the printed circuit board T. The touch detection circuit 40 on the printed circuit board T may have the function of the control circuit 65.

As illustrated in FIG. 20, drive electrode blocks B of the drive electrodes COML intersect with the touch detection electrodes E3 serving as the detectors viewed in a direction perpendicular to the surface of the first substrate 21.

The drive electrodes COML are divided as a plurality of stripe electrode patterns extending in one direction. To perform a touch detection operation, the drive driver 60 sequentially supplies a drive signal VcomAC to the electrode patterns. The drive electrode block B illustrated in FIG. 20 corresponds to a plurality of stripe electrode patterns of the drive electrodes COML simultaneously supplied with the drive signal VcomAC. The drive electrode blocks B (drive electrodes COML) are arrayed in a direction along the long side of the display device with a touch detection function 10. The touch detection electrodes E3, which will be described later, extend in a direction intersecting with the extending direction of the drive electrode blocks B. The touch detection electrodes E3 are arrayed in a direction along the short side of the display device with a touch detection function 10, for example. The output end of the touch detection electrodes E3 is provided on the short side of the display device with a touch detection function 10 and coupled to the touch detection circuit 40 mounted on the printed circuit board T via the printed circuit board T. As described above, the touch detection circuit 40 is mounted on the printed circuit board T and coupled to the touch detection electrodes E3 arranged in parallel. The printed circuit board T simply needs a terminal. The printed circuit board T is not limited to a flexible printed circuit board and may be a rigid circuit board or a rigid-flexible circuit board. The touch detection circuit 40 is not necessarily mounted on the flexible circuit board and may be provided on a control circuit board arranged outside the module and coupled via the printed circuit board T. While the touch detection circuit 40 according to the present embodiment is a touch driver IC mounted on the printed circuit board T, part of the functions of the touch detection circuit 40 may be provided as functions of a micro-processing unit (MPU). Specifically, part of functions (e.g., noise reduction) included in various functions that can be provided as those of the touch driver IC, such as A/D conversion and noise reduction, may be performed by a circuit, such as an MPU, which is provided separately from the touch driver IC. In a case where one driver IC is provided (one-chip configuration), detection signals may be transmitted to the touch driver IC on an array substrate via wiring of the printed circuit board T, for example.

The display area Ad includes a number of pixels Pix arranged in a matrix (in rows and columns). The frame Gd is an area including no pixel Pix viewed in the direction perpendicular to the surface of the first substrate 21. The gate driver 12, the drive driver circuits 60A and 60B, the selector 70, the COG 19, and the like, are arranged in the frame Gd.

The gate driver 12 includes the gate drivers 12A and 12B, for example. The gate drivers 12A and 12B include TFT elements on the first substrate 21. The gate drivers 12A and 12B sandwich the display area Ad including the sub-pixels Spix (pixels) arranged in a matrix and can drive them from both sides. Scanning lines are arranged between the gate drivers 12A and 12B. Specifically, the scanning lines extend in a direction parallel to the extending direction of the drive electrodes COML viewed in the direction perpendicular to the surface of the first substrate 21. While the gate driver 12 includes two circuits as the gate drivers 12A and 12B, this is given just as an example of a specific configuration of the gate driver 12, and the configuration thereof is not limited thereto. The gate driver 12 may be one circuit provided at only one ends of the scanning lines, for example.

The drive driver circuits 60A and 60B include TFT elements on the first substrate 21, for example. The drive driver circuits 60A and 60B are supplied with display drive voltage VcomDC via display wiring LDC and with the drive signal VcomAC via touch wiring LAC from a drive signal generator. The drive driver circuits 60A and 60B can drive, from both sides, the individual drive electrode blocks B arranged in parallel. The display wiring LDC that supplies the display drive voltage VcomDC and the touch wiring LAC that supplies the touch drive signal VcomAC are arranged in the frame Gd. The display wiring LDC is arranged closer to the display area Ad than the touch wiring LAC. With this configuration, the display drive voltage VcomDC supplied by the display wiring LDC stabilizes the potential state at the ends of the display area Ad. This configuration stabilizes display especially in a liquid crystal display device including lateral electric-field mode liquid crystals. While the drive driver 60 includes two circuits as the drive driver circuits 60A and 60B, it may include only one of them.

The display apparatus with a touch detection function illustrated in FIG. 20 is coupled to the printed circuit board T in the extending direction of the touch detection electrodes E3. This configuration facilitates routing of the wiring to couple the pixel substrate 2 to the touch detection circuit 40 via the printed circuit board T serving as a terminal.

Figure 21:
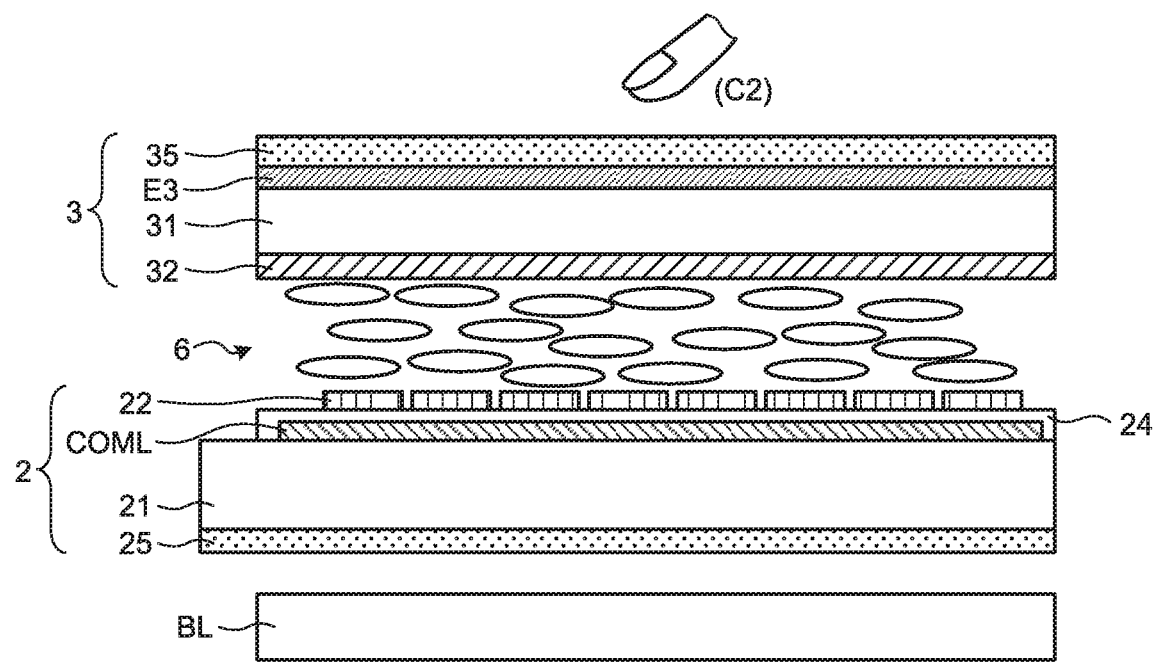
FIG. 21 is a sectional view of a schematic structure of a display device with a touch detection function.
Figure 22:
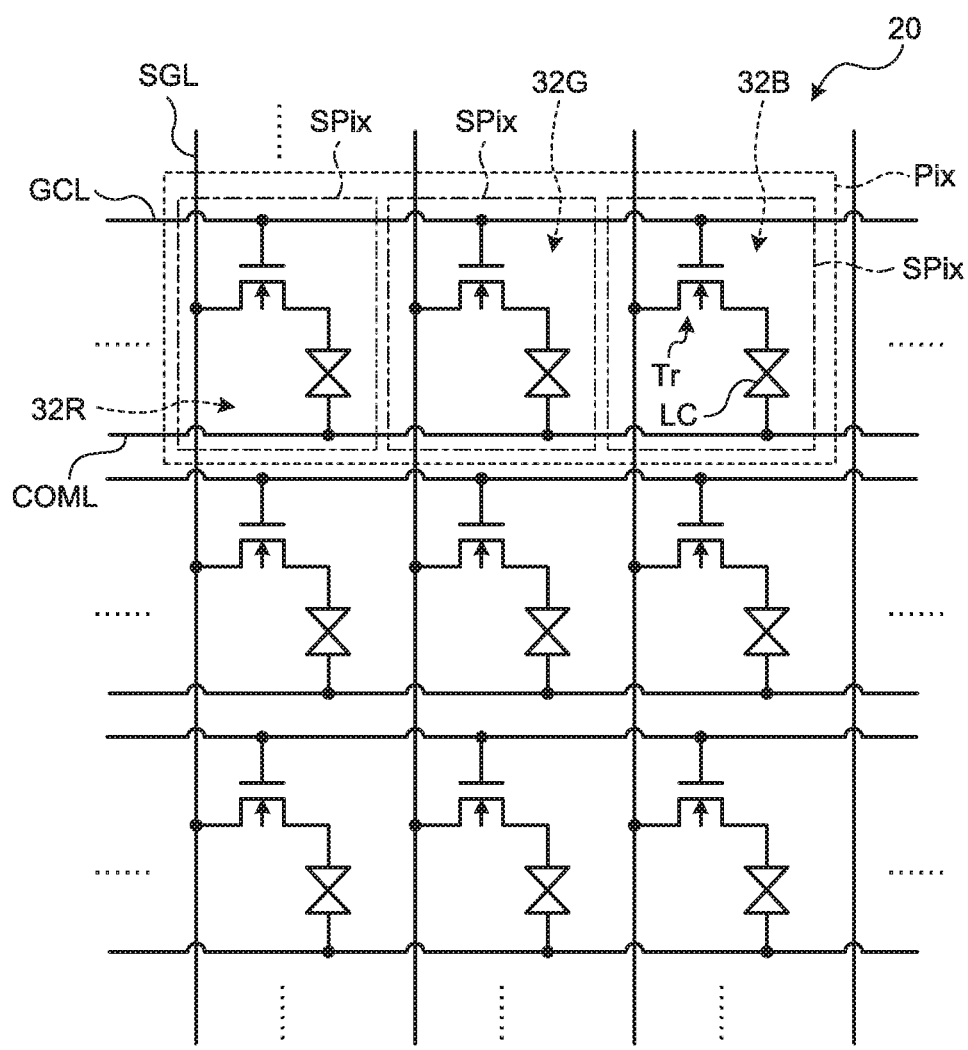
FIG. 22 is a circuit diagram of arrangement of pixels in the display device with a touch detection function.

FIG. 21 is a sectional view of a schematic structure of the display device with a touch detection function. FIG. 22 is a circuit diagram of arrangement of pixels in the display device with a touch detection function. The display device with a touch detection function 10 includes the pixel substrate 2, a counter substrate 3, and a display functional layer 6. The counter substrate 3 is arranged facing the pixel substrate 2 in the direction perpendicular to the surface of the pixel substrate 2. The display functional layer 6 is interposed between the pixel substrate 2 and the counter substrate 3. The display functional layer 6 according to the present embodiment is a liquid crystal layer.

The pixel substrate 2 includes the first substrate 21, a plurality of pixel electrodes (first electrodes) 22, a plurality of drive electrodes (second electrodes) COML, and an insulating layer 24. The first substrate 21 serves as a circuit board. The pixel electrodes 22 are arranged in a matrix on the upper side of the first substrate 21. The drive electrodes COML are provided between the first substrate 21 and the pixel electrodes 22. The insulating layer 24 insulates electrically the pixel electrodes 22 from the drive electrodes COML. The first substrate 21 is provided with thin-film transistor (TFT) elements Tr of the corresponding sub-pixels SPix illustrated in FIG. 22 and with various wiring lines, such as signal lines SGL and scanning lines GCL. The signal lines SGL supply the pixel signals Vpix to the pixel electrodes 22 illustrated in FIG. 21. The scanning lines GCL drive the TFT elements Tr. The signal lines SGL extend on a plane parallel to the surface of the first substrate 21 and supply the pixel signals Vpix for displaying an image to the pixels. The display panel 20 illustrated in FIG. 22 includes a plurality of sub-pixels SPix arrayed in a matrix. The sub-pixels SPix each include the TFT element Tr and a liquid crystal element LC. The TFT element Tr is a TFT and is an n-channel metal oxide semiconductor (MOS) TFT in this example. One of the source and the drain of the TFT element Tr is coupled to the signal line SGL, the gate thereof is coupled to the scanning line GCL, and the other of the source and the drain thereof is coupled to a first end of the liquid crystal element LC. The first end of the liquid crystal element LC is coupled to the drain of the TFT element Tr, for example, and a second end thereof is coupled to the drive electrode COML. The positions of the pixel electrodes 22 and the positions of the drive electrodes COML may be reversed. Alternatively, the pixel electrodes 22 and the drive electrodes COML may be provided in a single layer.

The sub-pixel SPix illustrated in FIG. 22 is coupled to other sub-pixels SPix belonging to the same row in the display panel 20 by the scanning line GCL. The scanning lines GCL are coupled to the gate driver 12. The scanning signal Vscan is supplied to the scanning lines GCL from the gate driver 12. The sub-pixel SPix is coupled to other sub-pixels SPix belonging to the same column in the display panel 20 by the signal line SGL. The signal lines SGL are supplied with the pixel signals Vpix from the source driver 13. The sub-pixel SPix is also coupled to the other sub-pixels SPix belonging to the same row in the display panel 20 by the drive electrode COML. The drive signal Vcom is supplied to the drive electrodes COML from the drive driver 60. In other words, a plurality of sub-pixels SPix belonging to the same row share one drive electrode COML in this example. While one drive electrode is shared by the sub-pixels SPix belonging to one row in this example, it may be shared by the sub-pixels SPix belonging to a plurality of rows. The extending direction of the drive electrodes COML according to the present embodiment is parallel to that of the scanning lines GCL. The extending direction of the drive electrodes COML according to the present embodiment is not limited thereto and may be parallel to that of the signal lines SGL. The touch detection electrodes E3 simply need to extend in a direction intersecting with the extending direction of the drive electrodes COML constituting the drive electrode blocks B. The extending direction of the touch detection electrodes E3 may be appropriately changed depending on the extending direction of the drive electrodes COML within the range described above.

The drive electrodes COML extend with their ends facing the components that output the drive signal Vcom (e.g., the drive driver circuits 60A and 60B serving as the specific components of the drive driver 60). This configuration can easily reduce the length of wiring provided between the drive electrodes COML and the components. Similarly, the touch detection electrodes E3 extend with their end facing the selector 70. This configuration can reduce easily the length of wiring provided between the touch detection electrodes E3 and the selector 70.

The gate driver 12 illustrated in FIG. 16 applies the scanning signal Vscan to the gates of the TFT elements Tr of the pixels Pix via the scanning line GCL illustrated in FIG. 22. The gate driver 12 thus sequentially selects one row (one horizontal line) out of the sub-pixels SPix arranged in a matrix in the display panel 20 as a target of display drive. The source driver 13 illustrated in FIG. 16 supplies the pixel signals Vpix, via the signal lines SGL illustrated in FIG. 22, to the sub-pixels SPix belonging to one horizontal line sequentially selected by the gate driver 12. Based on the supplied pixel signals Vpix, the sub-pixels SPix perform display of one horizontal line. The drive driver 60 illustrated in FIG. 16 applies the drive signal Vcom to the drive electrode COML, thereby driving the drive electrodes COML.

In the display panel 20, the gate driver 12 drives to sequentially linearly scan the scanning lines GCL in a time-division manner, thereby sequentially selecting one horizontal line. In the display panel 20, the source driver 13 supplies the pixel signals Vpix to the sub-pixels SPix belonging to one horizontal line, thereby performing display of the horizontal line one by one. To perform the display operation, the drive driver circuits 60A and 60B are configured to apply the drive signal Vcom to the block including the drive electrodes COML corresponding to at least the horizontal line. The drive signal Vcom for the display operation is applied to at least one horizontal line on which the display operation is to be performed. The drive signal Vcom, for example, may be applied to all the drive electrodes COML, collectively. While the example illustrated in FIG. 20 includes two circuits as the drive driver circuits 60A and 60B, this is given just as an example of a specific configuration of the drive driver 60, and the configuration is not limited thereto. The specific configuration of the drive driver 60 may include one circuit provided at only one ends of the drive electrodes COML, for example.

The display functional layer 6 modulates light passing therethrough depending on the state of an electric field. When the drive electrodes COML are driven, voltage depending on the pixel signals Vpix supplied to the pixel electrodes 22 are applied, thereby generating an electric field. As a result, the liquid crystals in the display functional layer 6 are oriented depending on the electric field, thereby modulating light passing through the display functional layer 6. As described above, the pixel electrodes 22 and the drive electrodes COML respectively serve as first electrodes and second electrodes that generate an electric field in the display functional layer 6 (e.g., a liquid crystal layer). In other words, the display panel 20 serves as a display component that changes the display image depending on the electric charges applied to the first electrodes and the second electrodes. While the pixel electrodes 22 are the first electrodes, and the drive electrodes COML are the second electrodes in the following description, the pixel electrodes 22 may be the second electrodes, and the drive electrodes COML may be the first electrodes.

The display panel 20 according to the present embodiment is a liquid crystal display device including liquid crystals in a lateral electric-field mode, such as the fringe field switching (FFS) mode or the in-plane switching (IPS) mode. An orientation film may be provided between the display functional layer 6 and the pixel substrate 2 and between the display functional layer 6 and the counter substrate 3 illustrated in FIG. 21. The electric-field mode of the liquid crystals in the liquid crystal display device may be a longitudinal electric-field mode. In a case where the electric-field mode of the liquid crystals is a longitudinal electric-field mode, the second electrodes may be provided at a second substrate.

The counter substrate 3 includes a second substrate 31 and a color filter 32 provided on a first surface of the second substrate 31. The touch detection electrodes E3 are provided on a second surface of the second substrate 31. A polarizing plate 35 is provided on the touch detection electrodes E3. The method for mounting the color filter 32 may be what is called a color-filter on array (COA) method of providing the color filter 32 on the pixel substrate 2 serving as an array substrate. The display panel 20 according to the present embodiment is what is called a transmissive liquid crystal display device. The display panel 20 includes a light device BL that outputs light from the side opposite to the display surface side (upper side in FIG. 21). A polarizing plate 25 is provided between the light device BL and the first substrate 21. In a case where the display panel 20 is what is called a reflective liquid crystal display device, a light device may be provided as a component that outputs light from the display surface side, for example, or is not necessarily provided.

The color filter 32 illustrated in FIG. 21 has color areas colored with three colors of red (R), green (G), and blue (B) and periodically arrayed, for example. Color areas 32R, 32G, and 32B of the three colors of R, G, and B correspond to the sub-pixels SPix and serve as a pixel Pix as a group. The pixels Pix are arranged in a matrix in a direction parallel to the scanning lines GCL and a direction parallel to the signal lines SGL in the display area Ad, which will be described later. The color filter 32 faces the display functional layer 6 in the direction perpendicular to the first substrate 21. As described above, each sub-pixel SPix can perform monochromatic display. The color filter 32 may have another combination of colors as long as they are different colors. Alternatively, the color filter 32 is not necessarily provided. In other words, the display panel 20 may have an area provided with no color filter 32, that is, sub-pixels SPix with no color. The number of sub-pixels SPix included in one pixel Pix may be four or more.

Figure 23:
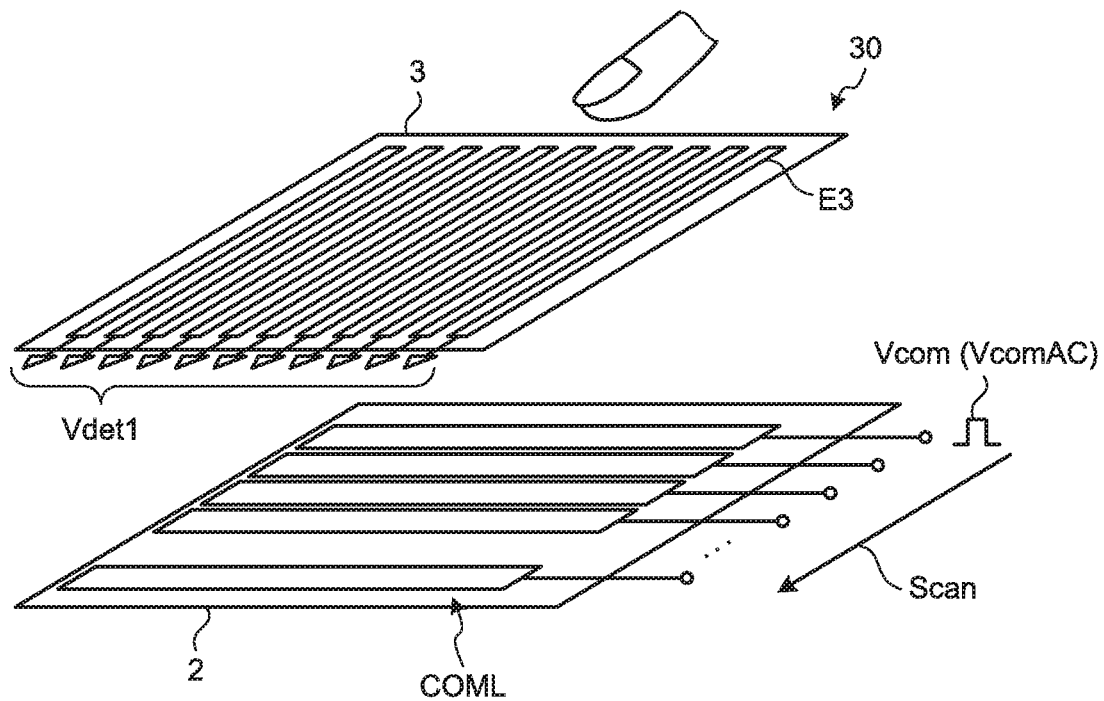
FIG. 23 is a perspective view of an exemplary configuration of drive electrodes and touch detection electrodes in the display device with a touch detection function.

FIG. 23 is a perspective view of another exemplary configuration of the drive electrodes and the touch detection electrodes in the display device with a touch detection function. The drive electrodes COML according to the present embodiment serve not only as drive electrodes of the display panel 20 but also as drive electrodes of the touch panel 30. The drive electrodes COML illustrated in FIG. 23 face the pixel electrodes 22 in the direction perpendicular to the surface of the first substrate 21. The drive electrodes COML in the pixel substrate 2 and the touch detection electrodes E3 in the counter substrate 3 constitute the touch panel 30. The touch detection electrodes E3 are constituted of stripe electrode patterns extending in a direction intersecting with the extending direction of the electrode patterns of the drive electrodes COML. At least part of the touch detection electrodes E3 face the drive electrodes COML in the direction perpendicular to the surface of the first substrate 21. The electrode patterns of the touch detection electrodes E3 are coupled to corresponding input terminals of the circuit 42 of the touch detection circuit 40. The electrode patterns of the drive electrodes COML and those of the touch detection electrodes E3 intersecting with each other have capacitance at the intersections thereof. When the drive driver 60 applies the drive signal VcomAC to the drive electrodes COML, the touch panel 30 outputs the touch detection signals Vdet1 from the touch detection electrodes E3, thereby performing touch detection. In other words, the drive electrodes COML correspond to the drive electrode E1 in the basic principle of touch detection described with reference to FIGS. 17 to 19, and the touch detection electrodes E3 correspond to the touch detection electrode E3 illustrated in FIG. 17. The touch panel 30 performs touch detection based on the basic principle. As described above, the touch panel 30 includes either the first electrodes or the second electrodes (e.g., the drive electrodes COML serving as the second electrodes) and the touch detection electrodes E3 that form capacitance. The touch panel 30 performs touch detection based on change in the capacitance.

As illustrated in FIG. 23, the electrode patterns intersecting with each other serve as a capacitance touch sensor formed in a matrix. With this configuration, the display device with a touch detection function performs scanning over the entire touch detection surface of the touch panel 30, thereby detecting a position where an external proximate object is in contact with or in proximity to the touch detection surface. Specifically, to perform a touch detection operation in the touch panel 30, the drive driver 60 drives to sequentially linearly scan the drive electrode blocks B illustrated in FIG. 20 in a time-division manner. As a result, each drive electrode block B (one detection block) of the drive electrodes COML are sequentially selected in a scanning direction Scan. The touch panel 30 outputs the touch detection signals Vdet1 from the touch detection electrodes E3. As described above, the touch panel 30 performs touch detection in one detection block.

The relation between the detection blocks and the number of lines used for display output may be optionally determined, and mechanisms, such as what is called bundling drive and shift drive, may be employed. In other words, a plurality of drive electrode blocks B may be simultaneously driven. In a case where a plurality of drive electrode blocks B are simultaneously driven, drive electrode blocks B serving as a drive electrode block group driven at a first timing may partially overlap with drive electrode blocks B serving as a drive electrode block group driven at a second timing.

The touch detection electrodes E3 or the drive electrodes COML (drive electrode blocks) do not necessarily have a shape divided into a plurality of stripe patterns. The touch detection electrodes E3 or the drive electrodes COML (drive electrode blocks) may have a comb shape, for example. The touch detection electrodes E3 or the drive electrodes COML (drive electrode blocks) simply need to have a shape divided into a plurality of pieces. The shape of slits that divide the drive electrodes COML may be a straight line or a curved line. While the touch detection electrodes E3 are made of ITO, for example, the specific structure and aspect thereof may be appropriately changed. The touch detection electrodes E3 may be made of a metallic conductive material. In this case, the touch detection electrodes E3 is made of a metallic material including at least one of aluminum (Al), copper (Cu), silver (Ag), molybdenum (Mo), and an alloy of these metals, for example. The touch detection electrodes E3 may be a multilayered body having a plurality of layers made of one or more of these metallic materials. In a case where the touch detection electrodes E3 are made of a metallic conductive material, they are preferably subjected to invisualization processing, such as mesh processing to form what is called a metal mesh structure and plating with a black material.

The touch detection electrodes E3 are coupled to the selector 70. Specifically, three touch detection electrodes are coupled to the input side of one switch unit, for example. With this configuration, when one integration line corresponding to one switch unit is not coupled to one touch detection electrode E3 included in the touch detection electrodes E3 but is coupled to the other touch detection electrodes E3, the one switch unit integrates outputs. The arithmetic circuit 83 in the display apparatus with a touch detection function 1 performs complementary processing based on the output integrated by the switch unit and calculates a detection result of the touch detection electrode E3 excluded in the integrated output. The number of touch detection electrodes E3 coupled to one integration line, that is, the number of touch detection electrodes E3 handled as one group may be four or more.

The explanation has been made for the display apparatus with a touch detection function 1 including a mutual capacitive capacitance touch panel according to the second embodiment. The touch detection method in the display apparatus with a touch detection function is not limited thereto and may be appropriately changed. While the touch detection electrodes E3 and the drive electrodes COML have a multilayer structure in FIG. 23, for example, they may be constituted of a single layer and arranged in parallel.

FIG. 21 and other figures illustrate an example of a specific configuration of what is called an in-cell system in which the drive electrodes COML are used not only for the display operation but also for the touch detection function. Alternatively, the display apparatus with a touch detection operation may employ what is called an on-cell system including drive electrodes for the display operation and drive electrodes for the touch detection operation separately. In this case, the touch detection electrodes E3 and drive electrodes for touch detection may be arranged together in the same layer provided.

The drive electrodes COML and the touch detection electrodes E3 extend in the individual directions. The present invention is not limited thereto, and the drive electrodes COML and the touch detection electrodes E3 may be formed into a block shape. In this case, the electrodes formed into a block shape may be coupled to wiring provided in a layer different from that of the electrodes, and the electrodes aligned in one direction may be coupled to each other by the wiring.

Figure 24:
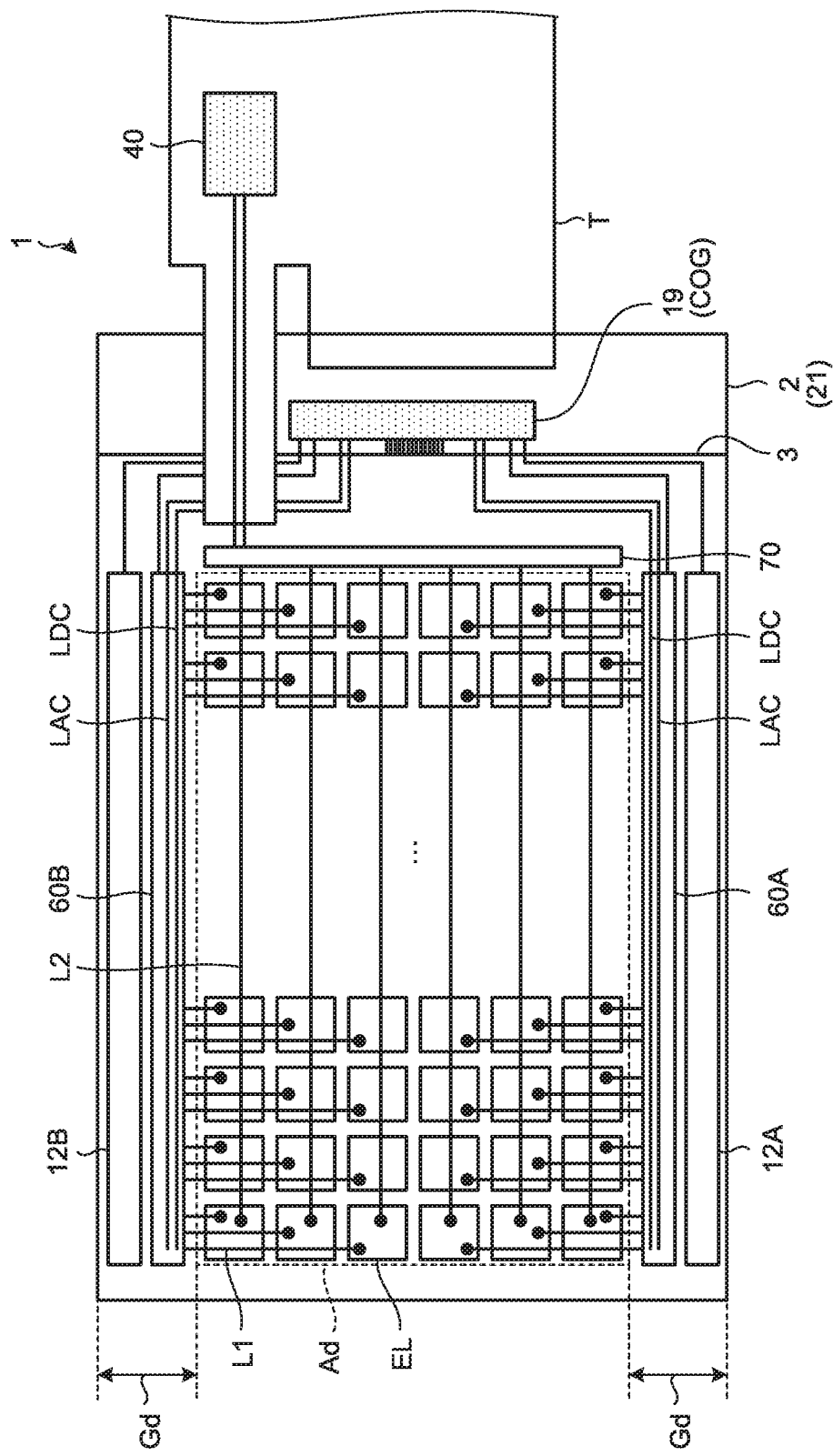
FIG. 24 is a diagram of an example of a self-capacitive display apparatus with a touch detection function.

FIG. 24 is a diagram of an example of a self-capacitive display apparatus with a touch detection function. As illustrated in FIG. 24, electrodes EL arranged in a matrix and serving as detectors may be used as electrodes for self-capacitive touch detection. In this case, the electrodes EL are coupled to the drive driver circuits 60A and 60B and the touch detection circuit 40 via coupling portions, such as respective wiring L1 and L2.

The selector 70 is provided on the substrate (e.g., the first substrate 21 of the pixel substrate 2) provided with the electrodes EL. Because the electrodes EL and the selector 70 are provided on a single substrate, the printed circuit board T need not be coupled to the counter substrate 3. While the touch detection circuit 40 is provided separately from the COG 19 in FIG. 24, the display apparatus with a touch detection function may include one circuit that integrates the functions of the touch detection circuit 40 and those of the COG 19. The wiring L1 and the wiring L2 may be integrated. In this case, the drive signal is transmitted via the integrated wiring that couples the selector 70 and the electrodes EL. The COG 19 illustrated in FIG. 24 includes the control circuit 65 of the first embodiment. The control circuit 65 may be provided at the printed circuit board T. The touch detection circuit 40 on the printed circuit board T may have the function of the control circuit 65.

FIG. 24 illustrates the wiring L2 for part of the electrodes EL alone. In the actual configuration, all the electrodes EL are individually provided with the wiring L2 or coupling portions similar thereto. The shape and the size of the electrodes EL may be optionally determined, and the size thereof may correspond to the size of the pixels, for example. In this case, one of electrodes constituting the pixel (e.g., pixel electrode or a counter electrode in the pixel of the display apparatus) may be used as the electrode EL. In other words, each of the electrodes EL may be used also as an electrode (e.g., the pixel electrode or the counter electrode) or as a wiring line (e.g., the signal line and the scanning line) controlling the display apparatus including a plurality of pixels.

Figure 25:
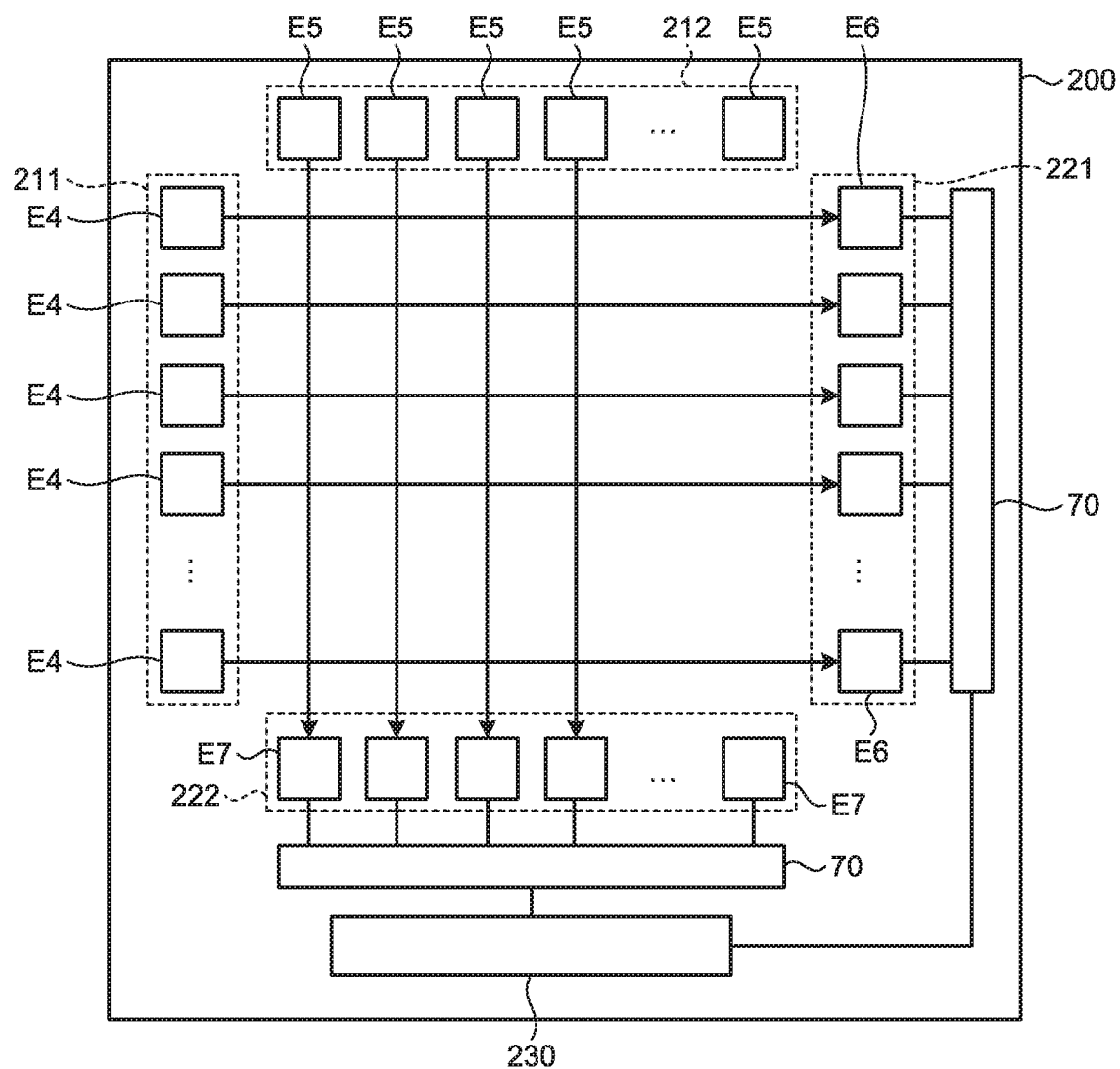
FIG. 25 is a diagram of an example of an optical touch panel.

FIG. 25 is a diagram of an example of an optical touch panel. As illustrated in FIG. 25, a touch panel 200 includes a light transmitter 211 and a light receiver 221. The light transmitter 211 includes a plurality of light emitters E4 that emit light in one direction. The light receiver 221 includes a plurality of light receptors E6 that receive light from the light transmitter 211 and serve as detectors. In the touch panel 200, three or more light receptors E6 that receive light traveling in the same direction may be handled as one group and coupled to a switch unit in the selector 70. The touch panel 200 illustrated in FIG. 25 also includes a light transmitter 212 and a light receiver 222. The light transmitter 212 includes a plurality of light emitters E5 that emit light in a direction different from the output direction of light from the light transmitter 211. The light receiver 222 includes a plurality of light receptors E7 that receive light from the light transmitter 212. In this configuration, three or more light receptors E7 that receive light traveling in the same direction may be handled as one group and coupled to a switch unit in a selector 70 provided separately from the selector 70 coupled to the light receiver 221. Output from the two selectors 70 is supplied to a touch detection circuit 230. The touch detection circuit 230 has functions of the A/D converter 82 and the arithmetic circuit 83, for example. The arithmetic circuit 83 performs complementary processing, thereby calculating a detection result of a light receptor excluded from the output integration by being decoupled from the integration line coupled to the switch unit in the selector 70. The arithmetic circuit 83 derives a touch detection result based on an optical touch detection algorithm. In other words, also in the optical touch panel, a switch unit in the selector 70 may integrate outputs when an integration line coupled to the switch unit is not coupled to one detector included in the group of three or more detectors (light receiver) but is coupled to the other detectors. The touch detection circuit 230 also includes the control circuit 65 of the first embodiment and thus functions as the control circuit 65.

The specific configuration of the optical touch panel is not limited to the configuration described with reference to FIG. 25. The optical touch panel may include photodiodes serving as the detectors in the detection area, for example. The mutual capacitive system or the optical system described above may be applied not only to the display apparatus with a touch detection function but also to a touch detecting apparatus with no display function.

Other advantageous effects that are provided by the aspects according to the embodiment and that are obvious from the present specification or appropriately conceivable by those skilled in the art are naturally provided by the present invention.

What is claimed is:
1. A touch detecting apparatus comprising:
a plurality of detection signal lines;
a plurality of detectors coupled to the detection signal lines on a one-to-one basis, and the number of which is N which is equal to or more than three;
a combination line;
a plurality of switches coupled to the detection signal lines on a one-to-one basis;
a control circuit configured to control output operation N times; and
an arithmetic circuit,
wherein, in an n-th output operation,
the control circuit configured to select one of the switches as a first type switch and the others of the switches as second type switches,
the first type switch is coupled to one of the detectors as a first type detector, the first type detector is an n-th detector and is not coupled to the combination line,
the second type switches are coupled to the others of the detectors as second type detectors on a one-to-one basis, the second type detectors are coupled to the combination line,
the combination line is configured to output a signal $D_n$,
n is equal to or more than zero and is equal to or less than N−1, and
wherein the arithmetic circuit is configured to calculate a signal $I_n$ output from the n-th detector based on Expression (1):

$$I_n = \frac{\sum_{\substack{i=n \\ i \neq n}}^{N-1} D_i - (N-2)D_n}{N-1}. \tag{1}$$

2. The touch detecting apparatus according to claim 1, wherein an arrangement of the detectors is a matrix arrangement.
3. The touch detecting apparatus according to claim 1, wherein lengths between each of the detectors and the combination line are substantially equal.
4. The touch detecting apparatus according to claim 1, wherein the detection signal lines are substantially equal in length.
5. The touch detecting apparatus according to claim 1, wherein each of the detectors is an electrode serving as a self-capacitive capacitance sensor.
6. The touch detecting apparatus according to claim 1, wherein each of the detectors is an electrode serving as a mutual capacitive capacitance sensor.
7. A display apparatus comprising:
a display device including a plurality of pixels; and
the touch detecting apparatus according to claim 1.
8. The display apparatus according to claim 7,
wherein the detectors are electrodes, and
wherein the electrodes are arranged in the pixels on a one-to-one basis and are used for displaying an image.

* * * * *